US006915337B1

(12) United States Patent
Motoyama et al.

(10) Patent No.: US 6,915,337 B1
(45) Date of Patent: Jul. 5, 2005

(54) METHOD AND SYSTEM FOR UPDATING THE DEVICE DRIVER OF A BUSINESS OFFICE APPLIANCE

(75) Inventors: Tetsuro Motoyama, Cupertino, CA (US); Hitoshi Sekine, Sunnyvale, CA (US)

(73) Assignee: Ricoh Co. Ltd., Tokyo (JP)

( * ) Notice: Subject to any disclaimer, the term of this patent is extended or adjusted under 35 U.S.C. 154(b) by 0 days.

(21) Appl. No.: 09/520,368

(22) Filed: Mar. 7, 2000

(51) Int. Cl.[7] ............................................. G06F 15/177
(52) U.S. Cl. ...................... 709/220; 709/221; 709/224; 719/327
(58) Field of Search ................................ 709/220, 221, 709/224, 327; 719/327

(56) References Cited

U.S. PATENT DOCUMENTS

| | | | | |
|---|---|---|---|---|
| 5,228,118 A | * | 7/1993 | Sasaki ........................ 358/1.13 |
| 5,412,779 A | | 5/1995 | Motoyama |
| 5,537,554 A | | 7/1996 | Motoyama |
| 5,544,289 A | | 8/1996 | Motoyama |
| 5,568,618 A | | 10/1996 | Motoyama |
| 5,580,177 A | * | 12/1996 | Gase et al. ..................... 400/61 |
| 5,649,120 A | | 7/1997 | Motoyama |
| 5,678,002 A | * | 10/1997 | Fawcett et al. ............. 345/709 |
| 5,768,495 A | * | 6/1998 | Campbell et al. ............. 714/25 |
| 5,774,678 A | | 6/1998 | Motoyama |
| 5,818,603 A | | 10/1998 | Motoyama |
| 5,819,110 A | | 10/1998 | Motoyama |
| 5,887,216 A | | 3/1999 | Motoyama |
| 5,908,493 A | | 6/1999 | Krymsky |
| 5,960,167 A | * | 9/1999 | Roberts et al. ............. 358/1.15 |
| 6,003,070 A | | 12/1999 | Frantz |
| 6,009,480 A | * | 12/1999 | Pleso ............................ 710/8 |
| 6,085,196 A | | 7/2000 | Motoyama et al. |
| 6,151,643 A | * | 11/2000 | Cheng et al. ................. 710/36 |
| 6,167,568 A | * | 12/2000 | Gandel et al. ............... 717/176 |
| 6,195,432 B1 | * | 2/2001 | Takahashi et al. ........... 380/277 |
| 6,208,956 B1 | | 3/2001 | Motoyama |
| 6,279,015 B1 | | 8/2001 | Fong et al. |
| 6,286,041 B1 | * | 9/2001 | Collins et al. ............... 709/221 |
| 6,325,540 B1 | * | 12/2001 | Lounsberry et al. ......... 378/207 |
| 6,378,069 B1 | * | 4/2002 | Sandler et al. ............... 713/153 |
| 6,411,678 B1 | * | 6/2002 | Tomlinson et al. ......... 379/1.01 |
| 6,433,882 B1 | * | 8/2002 | Mori et al. ................. 358/1.13 |
| 6,473,191 B2 | * | 10/2002 | Kohno ........................ 358/1.13 |
| 6,493,101 B1 | * | 12/2002 | Okazawa .................... 358/1.15 |
| 6,516,427 B1 | * | 2/2003 | Keyes et al. ................... 714/25 |
| 6,542,892 B1 | * | 4/2003 | Cantwell ...................... 707/10 |
| 6,560,643 B1 | * | 5/2003 | Shepherd et al. ............ 709/220 |
| 6,567,175 B1 | * | 5/2003 | Lee ............................. 358/1.14 |
| 6,603,571 B1 | * | 8/2003 | Nomoto ..................... 358/1.15 |
| 6,606,669 B1 | * | 8/2003 | Nakagiri ..................... 709/327 |
| 6,614,548 B1 | * | 9/2003 | Kisono ....................... 358/1.15 |
| 6,671,063 B1 | * | 12/2003 | Iida ............................ 358/1.15 |
| 6,690,481 B1 | * | 2/2004 | Yeung et al. ............... 358/1.15 |
| 2001/0054161 A1 | * | 12/2001 | Wooddruff .................... 714/27 |
| 2003/0137688 A1 | * | 7/2003 | Lawrence et al. ........... 358/1.15 |

FOREIGN PATENT DOCUMENTS

JP          2-172348        7/1990

* cited by examiner

*Primary Examiner*—Nabil El-Hady
(74) *Attorney, Agent, or Firm*—Oblon, Spivak, McClelland, Maier & Neustadt, P.C.

(57) ABSTRACT

A method, system and program product for implementing communication to download a driver to a target device or business office appliance using an electronic network message or e-mail. A newest driver for the device/appliance may be downloaded from, for example, a service center connected to the device/appliance through a Wide Area Network (WAN) such as the Internet. The device driver of a client computer using the device/appliance may be updated from the target device/appliance if it is determined that a user of the client computer desires to update the driver of the client computer.

27 Claims, 17 Drawing Sheets

METHOD AND SYSTEM FOR UPDATING THE DEVICE DRIVER OF A BUSINESS OFFICE APPLIANCE

CROSS-REFERENCES TO RELATED APPLICATIONS

The present application is related to U.S. patent application Ser. No. 09/453,877, filed Feb. 4, 2000, entitled "Method and System for Maintaining a Business Office Appliance through Log Files"; U.S. patent application Ser. No. 09/440,692, filed Nov. 16, 1999, entitled "Method and System to Monitor the Application Usage and Send Back the information Using Connection and Connectionless Mode"; U.S. patent application Ser. No. 09/440,693, filed Nov. 16, 1999, entitled "Method and System of Remote Diagnostic, Control and Information Collection Using a Dynamic Linked Library"; U.S. patent application Ser. No. 09/440,647, filed Nov. 16, 1999, entitled "Method and System to Monitor the Application Usage and Send Back the information Using Connection and Connectionless Mode", now U.S. Pat. No. 6,662,225, issued Dec. 9, 2003; U.S. patent application Ser. No. 09/440,646, filed Nov. 16, 1999, entitled "Method and System to Monitor the Application Usage and Send Back the Information Using Connection and Connectionless Mode"; U.S. patent application Ser. No. 09/440,645, filed Nov. 16, 1999, entitled "Application Unit Monitoring and Reporting System and Method With Usage Data Logged Into a Map Structure"; U.S. patent application Ser. No. 09/408,443, filed Sep. 29, 1999, entitled "Method and System for Remote Diagnostic, Control, and Information Collection Based on various Communication Modes for Sending Messages to a Resource Manager', now U.S. Pat. No. 6,631,247, issued Oct. 7, 2003'; U.S. patent application Ser. No. 09/407,769, filed Sep. 29, 1999, entitled "Method and System for Remote Diagnostic, Control and information Collection Based on various Communication Modes for Sending Messages to Users", now U.S. Pat. No. 6,581,092, issued Jun. 17, 2003; U.S. patent application Ser. No. 09/393,677, filed Sep. 10, 1999, entitled "Application Unit Monitoring and Reporting System and Method"; U.S. patent application Ser. No. 09/311,148, filed May 13,1999, entitled "Application Unit Monitoring and Reporting System and Method"; U.S. patent application Ser. No. 09/192,583, filed Nov. 17, 1998, entitled "Method and System for Communicating With a Device Attached to a Computer Using Electronic Mail Messages"; U.S. patent application Ser. No. 08/883,492, filed Jun. 26,1997, entitled "Method and System for Diagnosis and Control of Machines Using Connectionless Modes Having Delivery Monitoring and an Alternate Communication Mode"; U.S. patent application Ser. No. 08/820,633, filed Mar. 19, 1997, entitled "Method and System to Diagnose a Business Office Device Based on Operating Parameters Set by a User," now U.S. Pat. No. 5,887,216, issued Mar. 23, 1999; U.S. patent application Ser. No. 08/733,134, filed Oct. 16, 1996, entitled "Method and System for Diagnosis and Control of Machines Using Connectionless Modes of Communication," now U.S. Pat. No. 5,909,493, issued Jun. 1, 1999; U.S. patent application Ser. No. 08/880,683, filed Jun. 23, 1997, now U.S. Pat. No. 6,330,628, issued Dec. 11, 2001, U.S. patent applications Ser. No. 09/107,989, now U.S. Pat. No. 6,801,331, issued Oct. 5, 2004, and Ser. No. 09/108,705, both of which were filed Jul. 1, 1998, all three of which are entitled "Method and System for Controlling and Communicating with Machines Using Multiple Communication Formats," and all three of which are divisions of U.S. patent application Ser. No. 08/624,228, filed Mar. 29, 1996, entitled "Method and System for Controlling and Communicating with Machines Using Multiple Communication Formats," now U.S. Pat. No. 5,818,603, issued Oct. 6, 1998; U.S. patent application Ser. No. 09/457,669, entitled "Method and System for Diagnosis and Control of Machines Using Connection and Connectionless Modes of Communication," filed Dec. 9, 1999, which is a continuation of U.S. patent application Ser. No. 08/916,009, entitled "Method and System for Diagnosis and Control of Machines Using Connection and Connectionless Modes of Communication," filed Aug. 21, 1997, now abandoned, which is a continuation of, and U.S. patent application Ser Nos. 08/738,659 and 08/738,4 1, filed Oct. 30, 1996, both of which are entitled "Method and System for Diagnosis and Control of Machines Using Connection and Connectionless Modes of Communication," which are divisions of, U.S. patent application Ser. No. 08/463,002, filed Jun. 5, 1995, entitled "Method and System for Diagnosis and Control of Machines Using Connection and Connectionless Modes of Communication", now U.S. Pat. No. 5,819,110, issued Oct. 6, 1998, and U.S. patent application Ser. No. 08/852,413, filed May 7, 1987, entitled "Method and System for Controlling and Communicating with Business Office Devices," now U.S. Pat. No. 5,774,678, issued Oct. 22, 1996, which is a continuation of U.S. patent application Ser. No. 08/698,068, filed Aug. 15, 1996, entitled "Method and Apparatus for Controlling and Communicating With Business Office Devices", now U.S. Pat. No. 5,649,120, issued Jul. 15, 1997, which is a continuation of U.S. patent application Ser. No. 08/562,192, filed Nov. 22, 1995, now U.S. Pat. No. 5,568,618, issued Oct. 22, 1996, entitled "Method and Apparatus for Controlling and Communicating With Business Office Devices", which is a continuation of U.S. patent application Ser No. 08/473,780, filed Jun. 6, 1995, entitled for Controlling and Communicating With Business Office Devices", now U.S. Pat. No. 5,544,289, issued Aug. 6, 1996, which is a continuation of U.S. patent application Ser. No. 08/426,679, filed Apr. 24, 1995, entitled "Method and Apparatus for Controlling and Communicating With Business Office Devices," now U.S. Pat. No. 5,537,554, issued Jul. 16, 1996, which is a continuation of U.S. patent application Ser. No. 08/282, 168, filed Jul. 28, 1994, entitled "Method and Apparatus "Method and Apparatus for Controlling and Communicating With Business Office Devices", now U.S. Pat. No. 5,412,779, issued May 2, 1995, which is a continuation of U.S. patent application Ser. No. 07/902, 462, filed Jun. 19, 1992, now abandoned, which is a continuation of U.S. patent application Ser. No. 07/549,278, filed Jul. 6, 1990, now abandoned, the disclosure of each is incorporated herein by reference.

BACKGROUND OF THE INVENTION

1. Field of the Invention

This invention generally relates to the use of a network device/appliance to store its own newest driver, or other desired device driver desired by a user and to assist other computers or devices to update their drivers for using the device/appliance. This invention is further related to configuring a service center or resource administration station to download the newest or desired driver to the network device/appliance remotely.

2. Discussion of the Background

The cross-referenced applications and patents listed above show various methods to communicate with networked devices and appliances. In particular, a service center can establish communication via either direct communication (e.g., a connectionless (UDP) socket or connection-based (TCP) socket using an information protocol (e.g., an HTTP or FTP), or indirect communication (e.g., a store-and-forward system such as electronic mail (e-mail))).

Business office appliances such as copiers, facsimiles, multi-function image processors, printers and image storage systems have been connected to networks recently. However, in order to use the business office appliances, the device drivers of the appliances need to be installed at client computers. As newer drivers become available, it is necessary to update the driver of each client computer to take full advantage of the functions added by the newer driver.

SUMMARY OF THE INVENTION

Accordingly, it is an object of this invention to provide a novel method, system and program product for implementing communication to download a driver to a target device or business office appliance using an electronic network message or e-mail.

It is another object of this invention to provide a novel method, system and program product for implementing communication to download the newest, or desired, driver to the target device or business office appliance using an electronic network message or e-mail.

It is another object of this invention to provide a novel method, system and program product in which the device driver checks the version with the target device or appliance to determine whether it is the newest, or a desired version.

It is yet another object of this invention to provide a novel method, system and program product which updates the device driver of a client computer if it is determined that its version is older and if it is determined that a user desires updating the device driver.

These and other objects are accomplished by a novel method, system, and program product in which an electronic network message or e-mail message including the newest, or desired driver is sent to the target device/appliance. When the driver is stored in the device/appliance, a table (index or menu) is updated with information indicating the version of the driver, for example, the version number, and the effective date. When the client computer for the device/appliance tries to use the device/appliance by requesting a task to be performed, the driver of the device/appliance determines whether it is the newest, or desired version. After the device/appliance performs the requested task, the user is given a choice to update the driver or not to update the driver. If the user of the computer chooses to update the driver, the newest, or desired driver will be downloaded from the device/appliance and will be installed into the device.

This invention allows the users of business office appliances to obtain and to install the newest or desired drivers for the business office appliances without significant effort.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
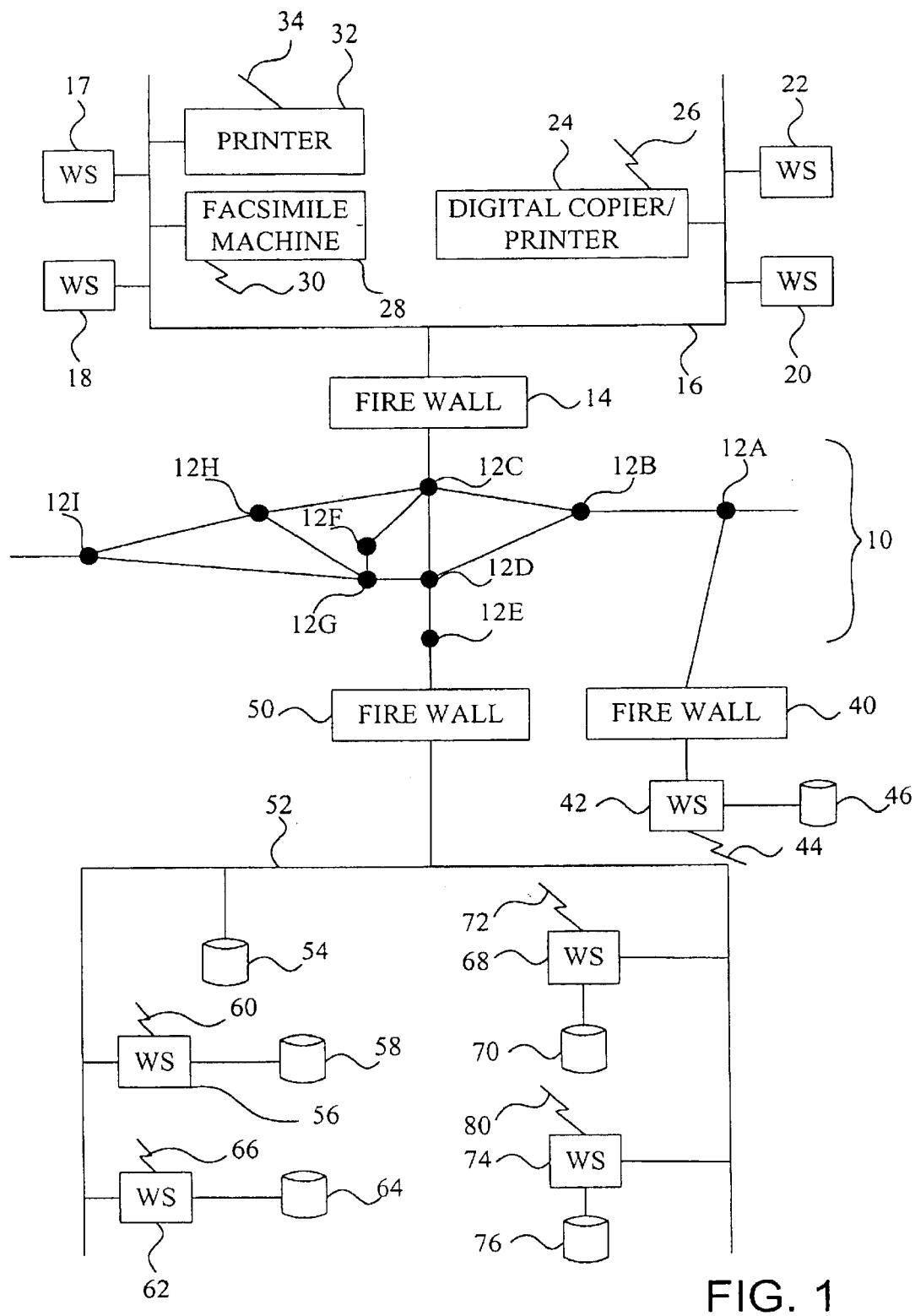
FIG. 1 illustrates three networked business office appliances connected to a network of computers and databases through the Internet.

Referring now to the drawings, wherein like numerals designate identical or corresponding parts throughout the several views, FIG. 1 illustrates (1) various machines and (2) computers for monitoring, diagnosing, controlling and maintaining the operation of the machines. In FIG. 1, there is a first network 16, such as a Local Area Network (LAN) connected to computer workstations 17, 18, 20, and 22. The workstations can be any type of computers including Microsoft Operating System Computers, IBM Personal Computer compatible devices, Unix based computers, or Apple Operating System Computers such as Apple Macintoshes. Also connected to the network 16 are (1) a digital image forming apparatus 24, (2) a facsimile machine 28, and (3) a printer 32. As would be appreciated by one of ordinary skill in the art, two or more of the components of the digital image forming apparatus 24 and the facsimile machine 28 can be combined into a unified "image forming apparatus." The devices 24, 28 and 32 and the workstations 17, 18, 20 and 22 are referred to as machines, business office appliances, or monitored devices, and other types of devices may be used as the machines, business office appliances, or monitored devices, including any of the devices discussed below. Also, a facsimile server (not illustrated) or a thin server (not illustrated), a network scanner (not illustrated) or an image storage system (not illustrated) may be connected to the network 16 and may have a telephone, ISDN (Integrated Services Digital Network), wireless or cable connection. In addition to the digital image forming apparatus 24, facsimile machine 28, and printer 32 being connected to the network 16, these devices may also include conventional telephone and/or ISDN and/or wireless and/or cable connections 26, 30, and 34, respectively. As is explained below, the business office machines, business office appliances or business devices 24, 28, and 32 communicate with a remote monitoring, diagnosis, maintenance and control station, also referred to as a monitoring device, through the Intranet or Internet via the network 16 or by a direct telephone, ISDN, wireless or cable connection.

In FIG. 1, a wide area network (WAN) (e.g., the Internet or its successor) is generally designated by 10. The WAN 10 can either be a private WAN or a public WAN. The WAN 10 includes a plurality of interconnected computers and routers designated by 12A–12I. The manner of communicating over the Internet is known through Request for Comments (RFC) documents obtained from "http://www.ietf.org/rfc.html." TCP/IP (Transmission Control Protocol/Internet Protocol) related communication also is described in "TCP/IP Illustrated, Vol. 1, The Protocols," by Stevens from Addison-Wesley Publishing Company, 1994, which is incorporated herein by reference. Volumes 1–3 of "Internetworking with TCP/IP" by Comer and Stevens are also incorporated herein by reference in their entirety.

In FIG. 1, a firewall 14 is connected between the WAN 10 and the network 16. A firewall is a device or software that allows only authorized computers on one side of the firewall to access a network or other computers on the other side of the firewall. Firewalls are known and commercially available devices and/or software and, for example, include SunScreen from Sun Microsystems Inc. and FireWall-1 from CheckPoint Software Technologies Ltd. Similarly, a firewall 50 is connected between the WAN 10 and a network 52. Also, a firewall 40 is connected between the WAN 10 and a workstation 42.

The network 52 is a conventional network and includes a plurality of workstations 56, 62, 68 and 74. These workstations may be in different departments (e.g., marketing, manufacturing, design engineering and customer service departments) within a single company. In addition to the workstations connected via the network 52, there is a workstation 42 which is not directly connected to the network 52. Information in a database stored in a disk 46 may be shared using proper encryption and protocols over the WAN 10 to the workstations connected directly to the network 52. Also, the workstation 42 includes a direct connection to a telephone line and/or ISDN and/or cable and/or wireless network 44 and the database in disk 46 may be accessed through the telephone line, ISDN, cable or wirelessly. The cable used by this invention may be implemented using a cable which typically is used to carry television programming, a cable which provides for high speed communication of digital data typically used with computers or the like, or any other desired type of cable.

Information of the business office machines/devices/appliances 24, 28 and 32 may be stored in one or more of the databases stored in the disks 46; 54, 58, 64, 70 and 76. Known databases include (1) SQL databases by Microsoft, Oracle and Sybase (2) other relational databases, and (3) non-relational databases (including object oriented databases). Each of the customer service, marketing, manufacturing, and engineering departments may have their own database or may share one or more databases. Each of the disks used to store databases is a non-volatile memory such as a hard disk or optical disk. Alternatively, the databases may be stored in any storage device including solid state and/or semiconductor memory devices. As an example, disk 64 contains the marketing database, disk 58 contains the manufacturing database, disk 70 contains the engineering database and disk 76 contains the customer service database. Alternatively, the disks 54 and 46 store one or more of the databases, such as service histories, configuration and software information including device drivers and firmware, for various business office machines, devices, and appliances.

In addition to the workstations 56, 62, 68, 74 and 42 being connected to the WAN 10, these workstations may also include a connection to a telephone line, ISDN, wireless or cable which provides a direct connection to the machine being monitored, diagnosed, maintained and/or controlled. Alternatively, these workstations may be connected to the machine through the WAN 10 with a security encoded secure connection. Additionally, if one communication medium is not operating properly, one of the others can be automatically used for communication.

A feature of the present invention is the use of a "store-and-forward" mode of communication (e.g., Internet e-mail) or transmission or other network communication between a machine and a computer for diagnosing, maintaining and controlling the machine, and transmitting information regarding the machine state. Alternatively, the e-mail which is transmitted may be implemented using a mode of communication that makes direct, end-to-end connections.

Figure 2:
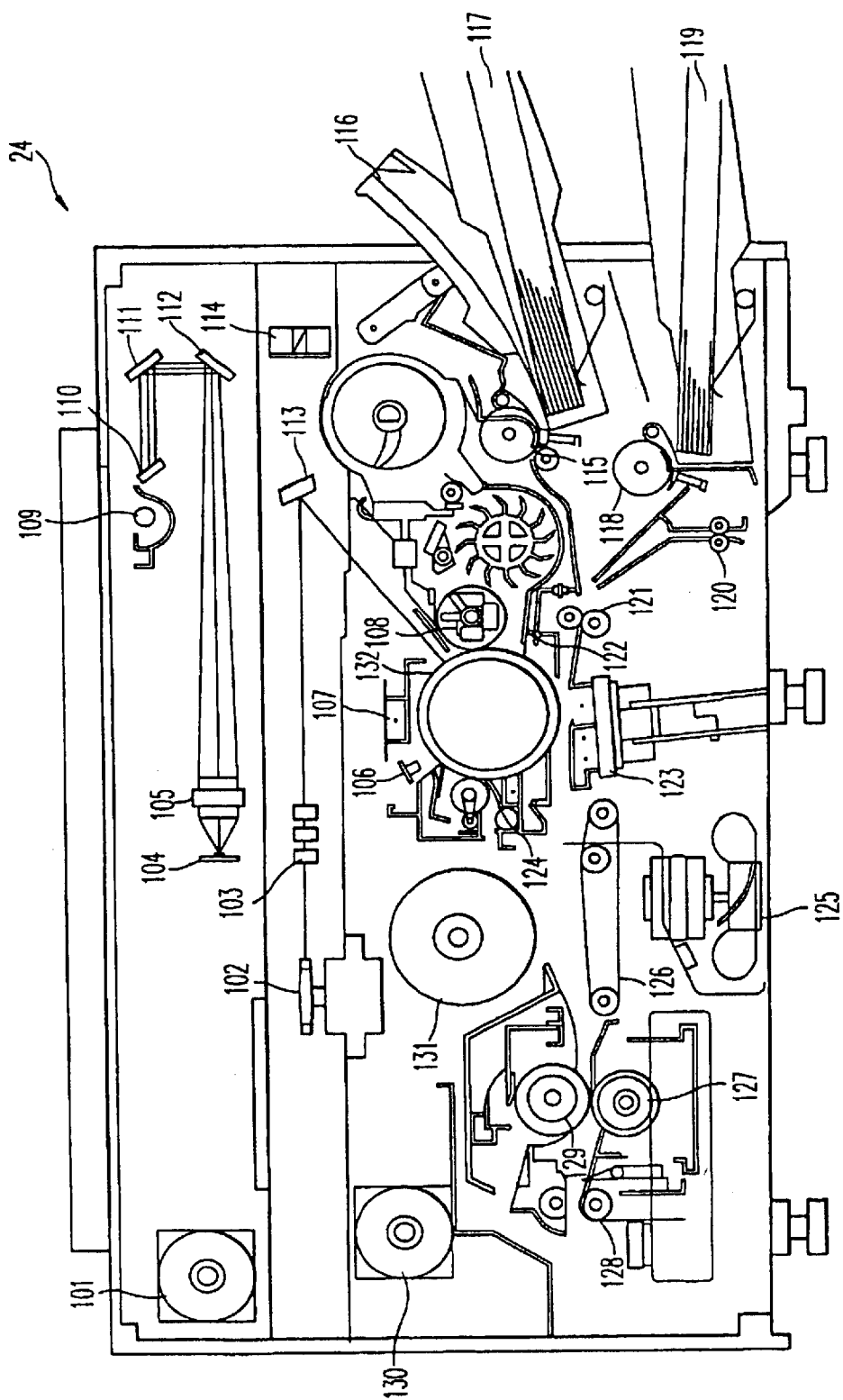
FIG. 2 illustrates the components of a digital image forming apparatus.

FIG. 2 illustrates the mechanical layout of the digital image forming apparatus 24 illustrated in FIG. 1. In FIG. 2, 101 is a fan for the scanner, 102 is a polygon mirror used with a laser printer, and 103 designates an Fθ lens used to collimate light from a laser (not illustrated). Reference numeral 104 designates a sensor for detecting light from the scanner, 105 is a lens for focusing light from the scanner onto the sensor 104, and 106 is a quenching lamp used to erase images on the photoconductive drum 132. There is a charging corona unit 107 and a developing roller 108. Reference numeral 109 designates a lamp used to illuminate a document to be scanned and 110, 111 and 112 designate mirrors used to reflect light onto the sensor 104. There is a drum mirror 113 used to reflect light to the photoconductive drum 132 originating from the polygon mirror 102. Reference number 114 designates a fan used to cool the charging area of the digital image forming apparatus, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller, 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital image forming apparatus.

Figure 3:
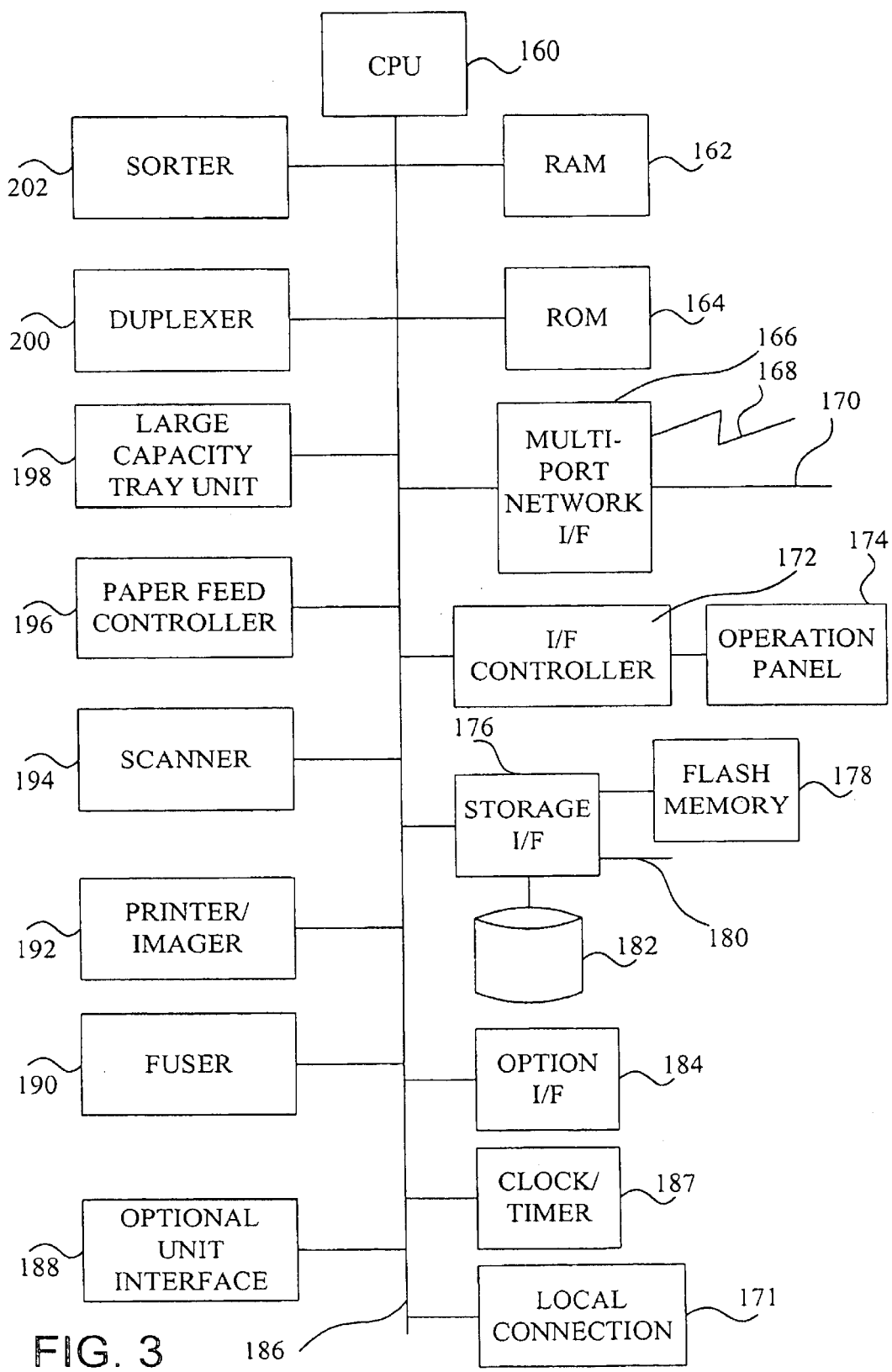
FIG. 3 illustrates the electronic components of the digital image forming apparatus illustrated in FIG. 2.

FIG. 3 illustrates a block diagram of the electronic components illustrated in FIG. 2. The CPU 160 is a microprocessor and acts as the system controller. Random access memory (RAM) 162 stores dynamically changing information including operating parameters of the digital image forming apparatus. A non-volatile memory (e.g., a read only memory (ROM) 164) stores the program code used to run the digital image forming apparatus and also information describing the digital image forming apparatus (static-state data) such as model number, serial number, installed ROM version, manufacturing lot number of the digital image forming apparatus and default parameters.

There is a multi-port network interface 166 which allows the digital image forming apparatus to communicate with external devices. Reference numeral 168 represents a telephone, ISDN, or cable line and 170 represents a LAN. Further information of the multi-port network interface is described in respect to FIG. 4. A local connection 171 includes one or more connections such as SCSI, IEEE 1394, USB, Centronics and RS232 to communicate with a host computer that is directly connected to the business office appliance. An interface controller 172 is used to connect an operation panel 174 to a system bus 186. The operation panel 174 includes standard input and output devices found on a digital image forming apparatus including, for example, a copy button, keys to control the operation of the digital image forming apparatus such as number of copies, reducement/enlargement, darkness/lightness, etc. Additionally, a liquid crystal display may be included within the operation panel 174 to display parameters, and messages of the digital image forming apparatus to a user. Alternatively, the touch panel may be used for the display and keys.

A storage interface 176 connects storage devices to the system bus 186. The storage devices include a flash memory 178 which can be substituted by a conventional EEPROM and a disk 182. The disk 182 includes a hard disk, optical disk, and/or a floppy disk drive. There is a connection 180 connected to the storage interface 176 which allows for additional memory devices to be connected to the digital image forming apparatus. The flash memory 178 is used to store semi-static state data which describes parameters of the digital image forming apparatus which infrequently change over the life of the digital image forming apparatus. Such parameters include the options and configuration of the digital image forming apparatus. The flash memory 178 also may contain a portion of software that can be updated in the future through the network connection or other mechanism. An option interface 184 allows additional hardware such as a PC card to be connected to the digital image forming apparatus. A clock/timer 187 is utilized to keep track of both the time and date and also to measure elapsed time.

On the left side of FIG. 3, the various sections making up the digital image forming apparatus are illustrated. Reference numeral 202 designates a sorter and contains sensors and actuators used to sort the output of the digital image forming apparatus. There is a duplexer 200 which allows a duplex operation to be performed by the digital image forming apparatus and includes conventional sensors and actuators. The digital image forming apparatus includes a large capacity tray unit 198 which allows paper trays holding a large number of sheets to be used with the digital image forming apparatus. The large capacity tray unit 198 includes conventional sensors and actuators.

A paper feed controller 196 is used to control the operation of feeding paper into and through the digital image forming apparatus. A scanner 194 is used to scan images into the digital image forming apparatus and includes conventional scanning elements such as a light, mirror, etc. Additionally, scanner sensors are used such as a home position sensor to determine that the scanner is in the home position, and a lamp thermistor is used to ensure proper operation of the scanning lamp. There is a printer/imager 192 which prints the output of the digital image forming apparatus and includes a conventional laser printing mechanism, a toner sensor, and an image density sensor. A fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital image forming apparatus such as an automatic document feeder, a different type of sorter/collator, or other elements which can be added to the digital image forming apparatus.

Figure 4:
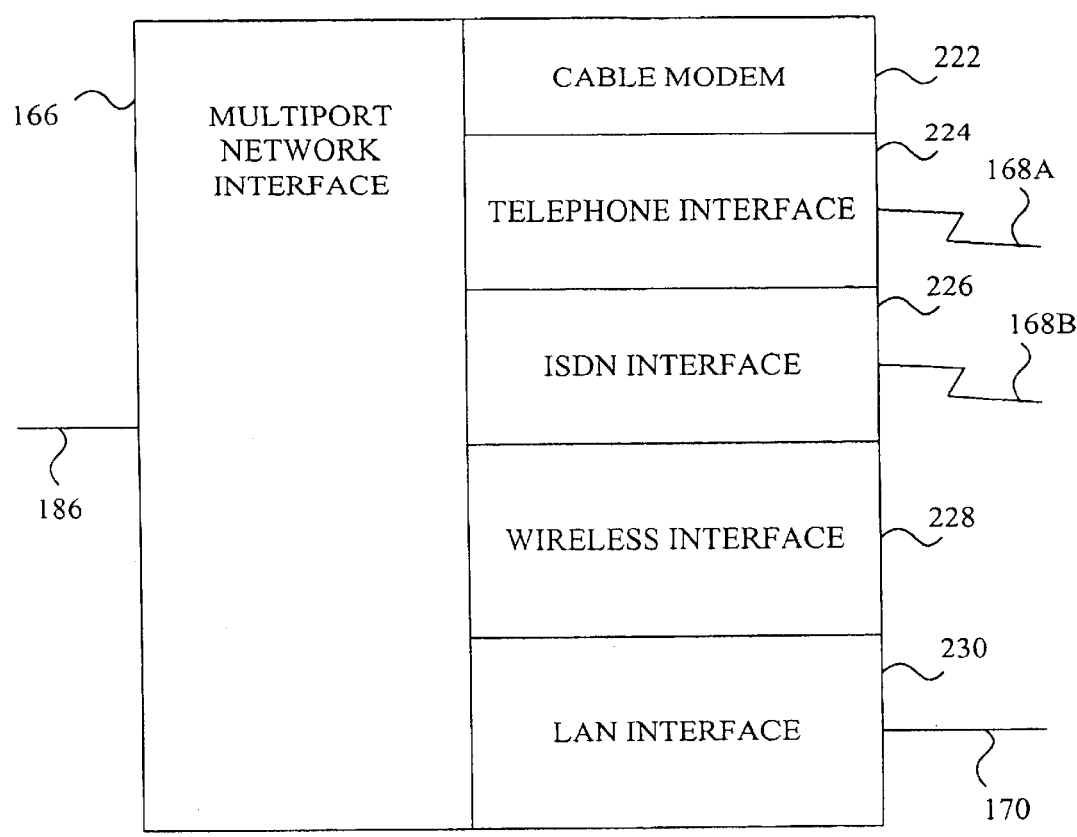
FIG. 4 illustrates details of multi-port network interface illustrated in FIG.

FIG. 4 illustrates details of the multi-port network interface 166. The digital image forming apparatus may communicate with external devices through a Cable Modem 222 which has a high speed connection over cable, a conventional telephone interface 224 which connects to a phone line 168A, an ISDN interface 226 which connects to an ISDN line 168B, a Wireless Interface 228 which connects to the WAN, and a LAN interface 230 which connects to a LAN 170. Other interfaces (not shown) include, but are not limited to, Firewire and Digital Subscriber Line (DSL) (original DSL, concentric DSL, and asymmetric DSL). FireWire (IEEE 1394) is described in Wickelgren, I., "The Facts About "FireWire", IEEE Spectrum, April 1997, Vol. 34, Number 4, pp. 19–25, the contents of which are incorporated herein by reference. Preferably, communication utilizes a "reliable" protocol with error detection and retransmission. Examples of such a protocol include Reliable Datagram Protocol (RDP) and Transmission Control Protocol (TCP). A single device which connects to both a Local Area Network and a telephone line is commercially available from Megahertz and is known as the Ethernet-Modem. An actual interface may incorporate one or more interfaces described here.

The CPU or other microprocessor or circuitry executes a monitoring process to monitor the state of each of the sensors of the digital image forming apparatus, and a sequencing process is used to execute the instructions of the code used to control and operate the digital image forming apparatus. Additionally, there is a central system control process executing to control the overall operation of the digital image forming apparatus and a communication process used to assure reliable communication to external devices connected to the digital image forming apparatus. The system control process monitors and controls data storage in a static state memory such as ROM 164 of FIG. 3, a semi-static memory such as the flash memory 178 or disk 182, or the dynamic state data which is stored in a volatile or non-volatile memory such as the RAM 162 or the flash memory 178 or disk 182. Additionally, the static state data may be stored in a device other than the ROM 164 such as a non-volatile memory including either the flash memory 178 or disk 182.

The above details have been described with respect to a digital image forming apparatus but the present invention is equally applicable to other business office machines, devices or appliances such as an analog copier, a facsimile machine, a scanner, a printer, a facsimile server, or an appliance with which a user interfaces (e.g., a microwave oven, VCR, TV, refrigerator, digital camera, cellular phone, palm top computer). Additionally, the present invention includes other types of machines, appliances or devices which operate using some communication method (e.g., store-and-forward or direct connection-based communication) to contact the remote device or computer, such as a metering system including a gas, water, or electricity metering system, household appliance, vending machines, or any other mechanical device (e.g., automobiles) that need to be monitored during operation or remote diagnosis. In addition to monitoring special purpose machines and computers, the invention can be used to monitor, control, and diagnose a general purpose computer which would be the monitored and/or controlled device, and information regarding resource usage by an end user may be communicated to a remote monitoring device and to the end user from a remote monitoring device.

Figure 5:
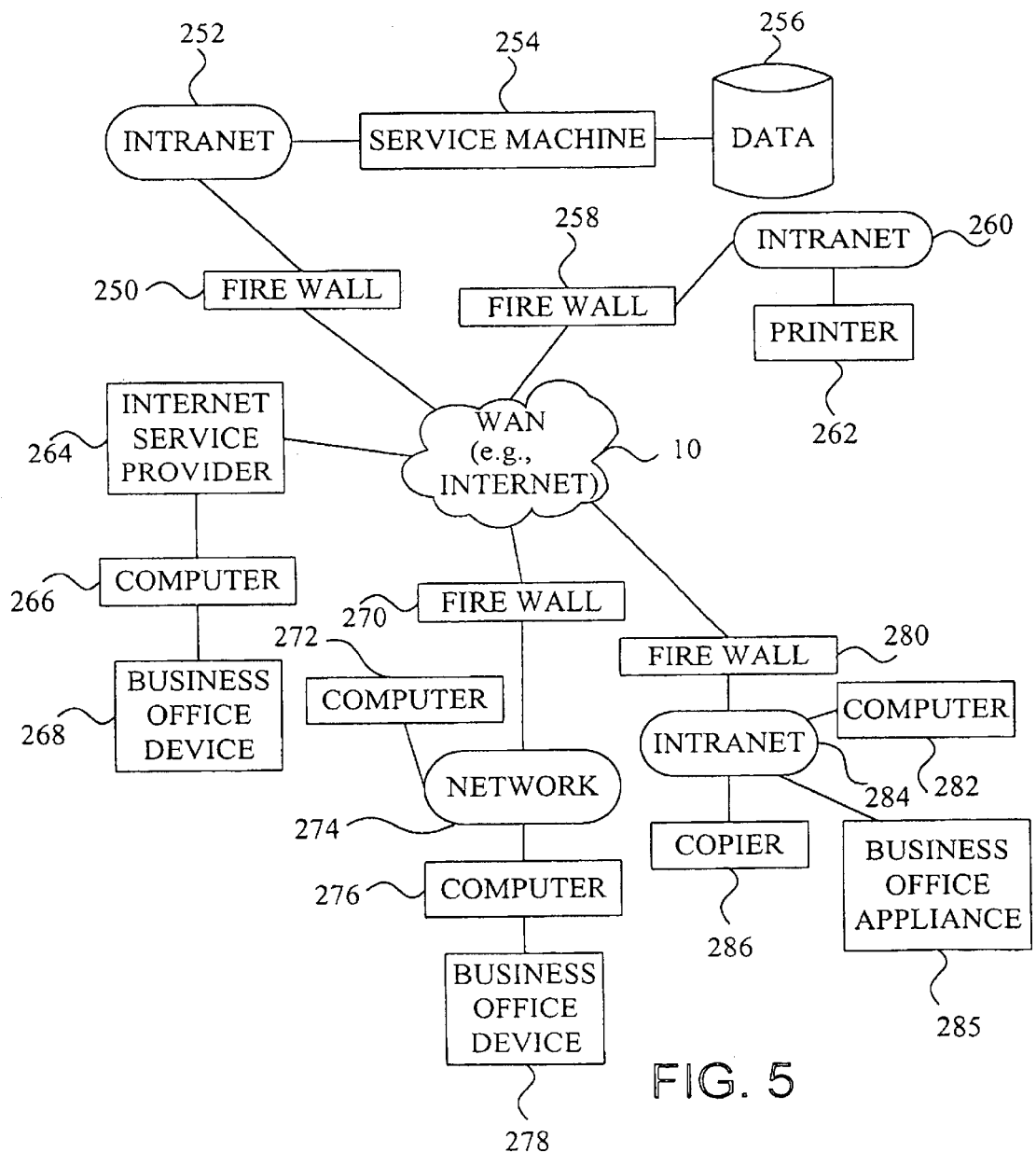
FIG. 5 illustrates an alternative system configuration in which business office appliances are either connected directly to the network or connected to a computer which is connected to the network.

FIG. 5 illustrates an alternative system diagram of the invention in which different devices and subsystems are connected to the WAN 10. However, there is no requirement to have each of these devices or subsystems as part of the invention. Each component or subsystem illustrated in FIG. 5 is individually part of the invention. Further, the elements illustrated in FIG. 1 may be connected to the WAN 10 which is illustrated in FIG. 5. In FIG. 5, there is illustrated a firewall 250 connected to an Intranet 252. The service machine 254 connected to the Intranet 252 includes therein or has connected thereto data 256 which may be stored in a database format. The data 256 includes configuration, service history, historical usage, performance, malfunction, resource usage information for particular devices or users of the devices, and any other information including statistical information of the operation or failure or set-up and components or optional equipment of which are being monitored. The service machine 254 may be implemented as the device or computer which transmits drivers to the device/appliance or which requests the monitored devices to transmit data or which requests that remote control and/or diagnosis tests be performed on the monitored devices, and which transmits information to the specified destinations including the monitored devices, computers or one or more persons. The service machine 254 may be implemented as any type of device and is preferably implemented using a computerized device such as a general purpose computer.

Another subsystem of FIG. 5 includes a firewall 258, an Intranet 260, and a printer 262 connected thereto. In this subsystem, the functions of sending and receiving electronic messages by the printer 262 (and similarly by a copier 286) are performed by circuitry, a microprocessor, or any other type of hardware contained within or mounted on the printer 262 (i.e., without using a separate general purpose computer). The electronic message includes e-mail messages and any other form of message through the network based upon various protocols such as SMTP (SIMPLE MAIL TRANSFER PROTOCOL) (RFC 821), FTP (FILE TRANSFER PROTOCOL) (RFC 959) and Hypertext Transfer Protocol—HTTP/1.1 (RFC 2616).

An alternate type of subsystem includes the use of an Internet service provider 264 which may be any type of Internet service provider (ISP), including known commercial companies such as America Online, AT & T, CompuServe, NiftyServe, Microsoft, the Internet service provider Erols or any other Internet service provider. In this subsystem, a computer 266 is connected to the ISP 264 through any communication means including a modem (e.g., a telephone line modem, a cable modem, modems which uses any type of wires such as modems used over an ISDN (Integrated Services Digital Network) line, ADSL (Asymmetric Digital Subscriber Line), DSL (Digital Subscriber Line), modems which use frame relay communication, ATM (Asynchronous Transfer Mode), wireless modems, a fiber optic modem, any digital or analog modem, or a device which uses infrared light waves). Further, a business office device 268 is connected to the computer 266. As an alternative to the business office device 268 (and any other device illustrated in FIG. 5), a different type of machine may be monitored or controlled such as a digital copier, any type of appliance, security system, or utility meter such as an electrical, water, or gas utility meter, or any other device discussed herein.

Also illustrated in FIG. 5 is a firewall 270 connected to a network 274. The network 274 may be implemented as any type of computer network (e.g., an Ethernet network or token-ring network). Networking software which may be used to control the network includes any desired networking software including free software such as Linux and software commercially available from Novell or Microsoft. The network 274 may be implemented as an Intranet, if desired. A computer 272 connected to the network 274 may be used as a monitoring device to control, to maintain, to obtain information from a business office device 278 and to generate reports such as reports showing problems which occurred in various machines connected to the network and usage reports of the devices connected to the network 274. In this embodiment, a computer 276 is connected between the business office device 278 and the network 274. The business office device 278 is a local device for the computer 276. This computer receives e-mail or any other form of communications from the network and forwards the appropriate commands or data, including device drivers, or any other information to the business office device 278. While it has been stated that the business office device 278 is connected to the computer 276 as a local device, there is no requirement for a wired connection between the business office device 278 and the computer 276. Communication between the business office device 278 and the computer 276 may be accomplished using wire-based or wireless methods including, but not limited to radio frequency connections, electrical connections and light connections (e.g., an infrared connection, or a fiber optics connection). Similarly, each of the various networks and intranets illustrated in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless technique which is disclosed in the Bluetooth Specification (available at the World Wide Web site "http://www.bluetooth.com"), which is incorporated herein by reference.

Another subsystem illustrated in FIG. 5 includes a firewall 280, an Intranet 284, a computer 282 connected thereto, a copier 286 and a business office appliance 285. The computer 282 may be used to generate reports and request diagnostic or control procedures. These diagnostic and control procedures may be performed with respect to the copier 286 or business office appliance 285 or any of the other devices illustrated in or used with FIG. 5. While FIG. 5 illustrates a plurality of firewalls, the firewalls are preferable but optional equipment and therefore the invention may be operated without the use of firewalls, if desired. Although Service Machine 254 is on the separate Intranet 252, any computer within Intranet 260, 274, or 284 can function as the Service Machine to maintain the business office devices/appliances. For example, a very large company may want to keep its own service machine while a small company may use an outside service.

Figure 6A:
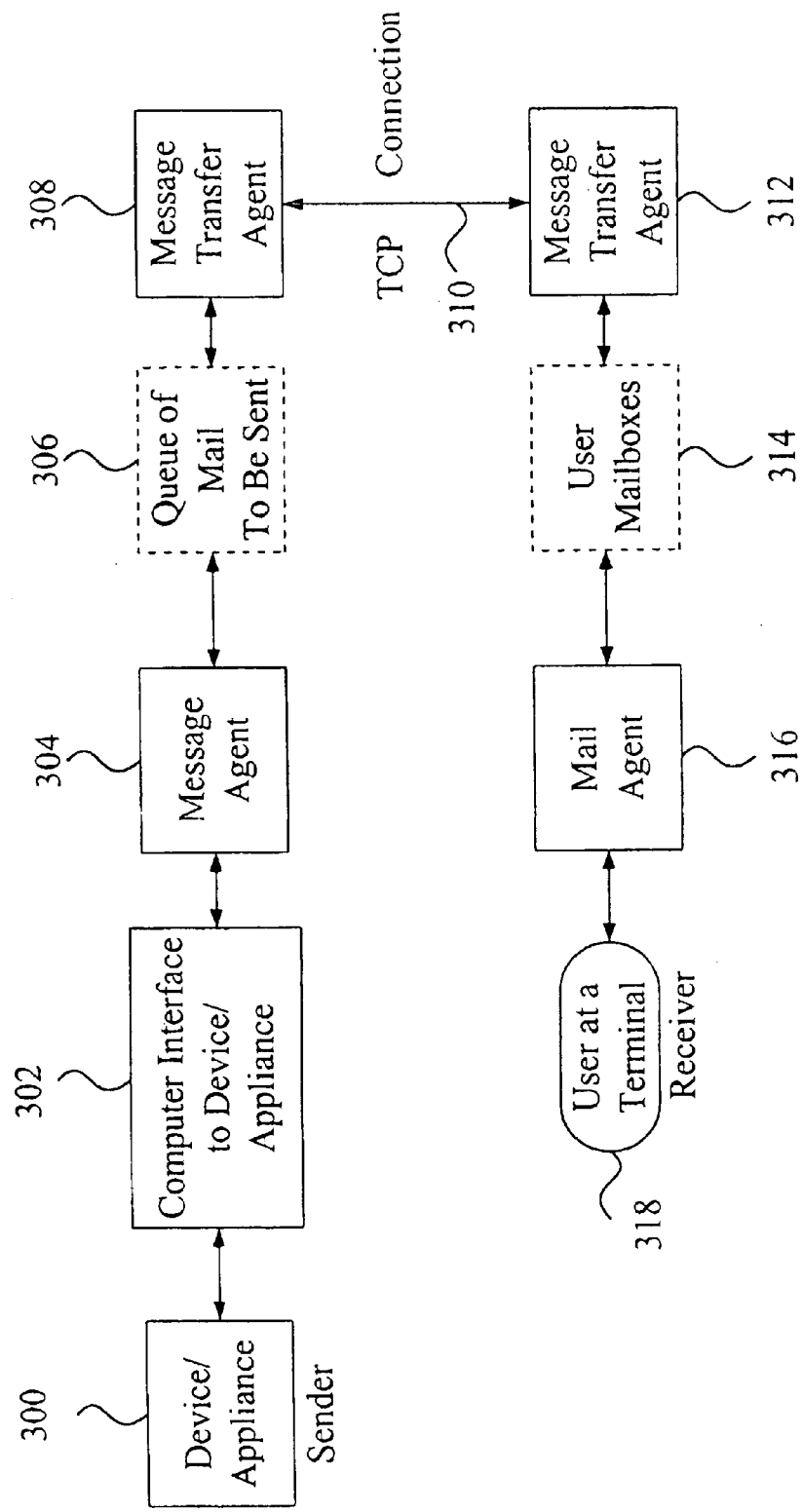
FIG. 6A illustrates in block diagram format the flow of information to and from a device/appliance using electronic mail.

FIG. 6A illustrates a device/appliance 300 connected to a typical e-mail exchange system which includes components 302, 304, 306, 308, 310, 312, 314, 316 and 318 which may be implemented in a conventional manner and are taken from Figure 28.1 of Stevens, as discussed previously. The device/appliance 300 may be any of the devices described herein and the computer interface 302 may interface any device/appliance 300 to computers, such as computer 276 illustrated in FIG. 5. While FIG. 6A illustrates the device/appliance 300 as being a sender, the sending and receiving function may be reversed in FIG. 6A. Furthermore, if desired, the user may not be needed to interface with the device/appliance 300 at all. The computer interface 302 then interacts with a message agent 304. Popular mail agents for Unix include MH, Berkeley Mail, Elm, and Mush. Mail agents for the Windows family of operating systems include Microsoft Outlook and Microsoft Outlook Express. At the request of the computer interface 302, the message agent 304 creates e-mail messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communication using a TCP (Transfer Control Protocol) connection or a TCP/IP (Internet Protocol) connection. Notably, the communication between the message transfer agents 308 and 312 may occur over any size network (e.g., WAN or LAN). Further, the message transfer agents 308 and 312 may utilize any communication protocol.

From the message transfer agent 312, e-mail messages are stored in user mailboxes 314 which are transferred to the mail agent 316 and ultimately transmitted to the user at a terminal 318 which functions as a receiving terminal.

This "store-and-forward" process avoids the sending message agent 304 from having to wait until establishment of the direct connection with the mail. Because of network delays, the communication could take a substantial amount of time during which the application would be unresponsive. Such an unresponsiveness is generally unacceptable to users of the device/appliance. By using e-mail as the store-and-forward process, retransmission attempts after failures occur automatically for a fixed period of time (e.g., three days). In an alternate embodiment, the application controlling the user interface can avoid waiting by passing communication requests to one or more separate threads. Those threads can then control communication with the receiving terminal 318 while the application begins responding to the user interface again. In yet another embodiment in which a user wishes to have communication completed before continuing, direct communication with the receiving terminal is used. Such direct communication can utilize any protocol not blocked by a firewall between the sending and receiving terminals. Examples of such protocols include SMTP, HTTP, gopher, FTP, and NNTP (Network News Transfer Protocol).

Public WANs, such as the Internet, are not considered to be secure. Therefore, messages transmitted over the public WANs (and multi-company private WANs) should be encrypted to keep the messages confidential. Encryption mechanisms are known and commercially available which may be used with the present invention. For example, a C library function, crypt( ), is available from Sun Microsystems for use with the Unix operating system. Other encryption and decryption software packages are known and commercially available and may also be used with this invention. One such package is PGP (Pretty Good Privacy) Virtual Private Network (VPN) available from Network Associates. Other VPN software is available, for example, from Microsoft Corporation.

Figure 6B:
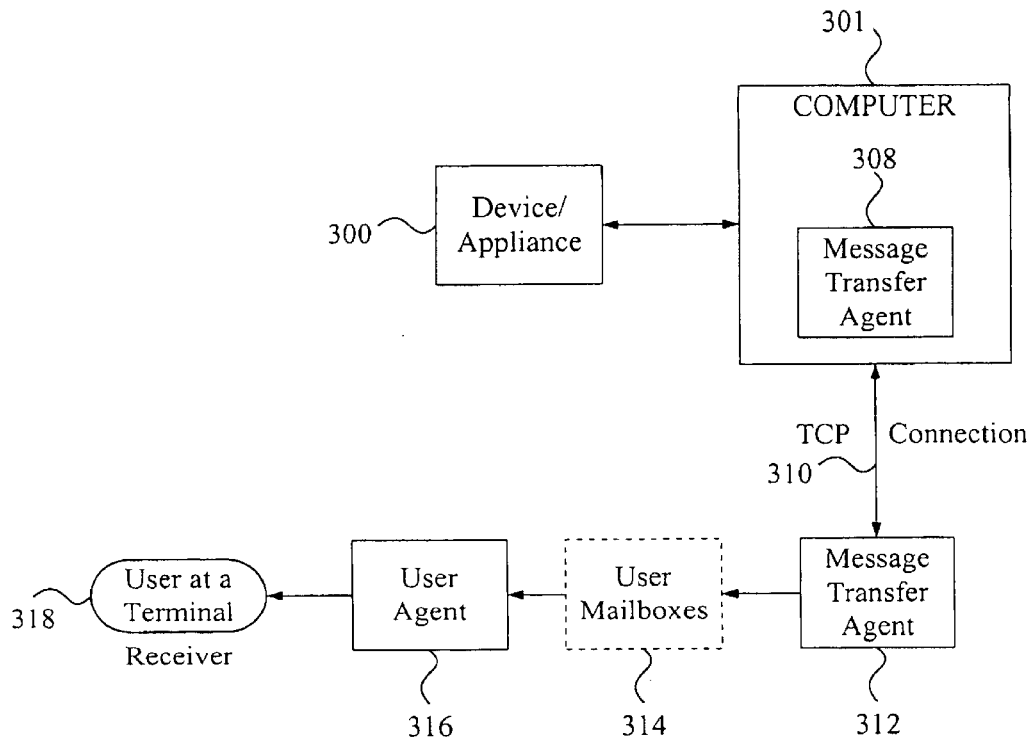
FIG. 6B illustrates an alternative way of communicating using electronic mail in which the computer which is connected to the device/appliance also serves as a message transfer agent.

As an alternative to the general structure of FIG. 6A, a single computer may be used which functions as the user terminal, and also the message transfer agent. As illustrated in FIG. 6B, the device/appliance 300 is connected to a computer 301 which includes the message transfer agent 308. If desired, the other components of the sending side of FIG. 6A may be included in the computer 301 of FIG. 6B including the message agent 304 and the queue of mail to be sent 306.

Figure 6C:
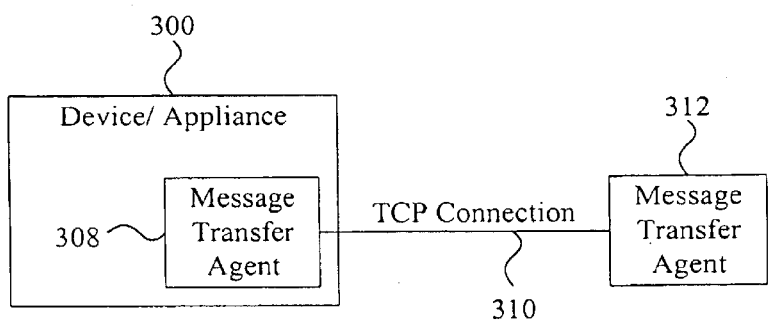
FIG. 6C illustrates an alternative way of communicating using electronic mail in which the device/appliance includes a message transfer agent.

A further alternative structure is shown in FIG. 6C in which the message transfer agent 308 is formed as part of the device/appliance 300. Further, the message transfer agent 308 is connected to the message transfer agent 312 by the TCP connection 310. In the embodiment of FIG. 6C, the device/appliance 300 is directly connected to the TCP connection 310 and has an e-mail capability. One use of the embodiment of FIG. 6C includes using a facsimile machine with an e-mail capability (defined in RFC 2305 (a simple mode of facsimile using Internet mail)) as the device/appliance 300.

Figure 7:
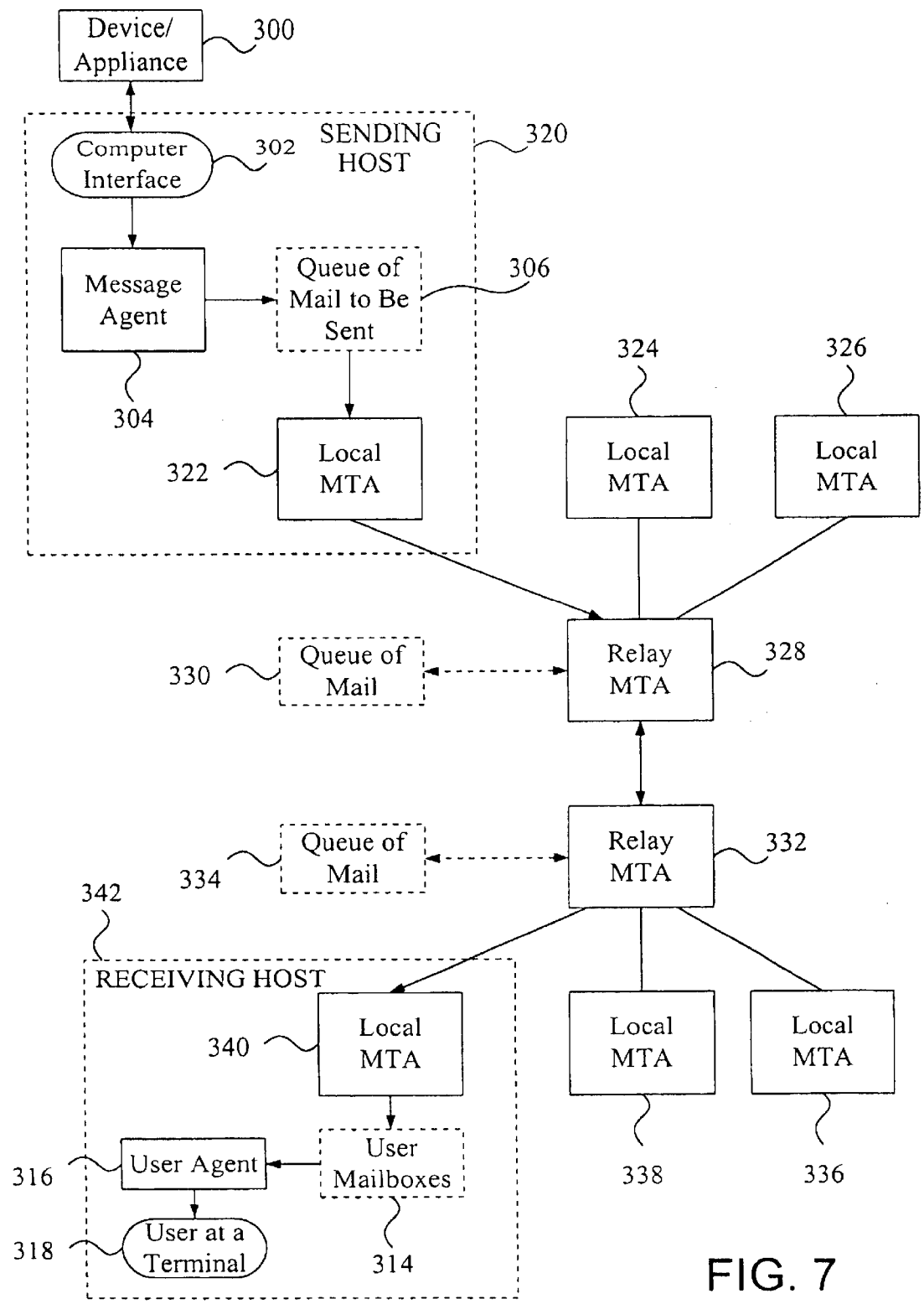
FIG. 7 illustrates an alternative manner of sending messages across the Internet.

FIG. 7 illustrates an alternative implementation of transferring mail and is based on FIG. 28.3 of Stevens. FIG. 7 illustrates an electronic mail system having a relay system at each end. The arrangement of FIG. 7 allows one system at an organization to act as a mail hub. In FIG. 7, there are four MTAs connected between the message agent 304 and the mail agent 316. These MTAs include local MTA 322, relay MTA 328, relay MTA 332, and local MTA 340. The most common protocol used for mail messages is SMTP (Simple Mail Transfer Protocol) (RFC 821) which may be used with this invention, although any desired mail protocol may be utilized. In FIG. 7, 320 designates a sending host which includes the computer interface 302, the message agent 304, and the local MTA 322. The device/appliance 300 is connected to, or alternatively included within, the sending host 320. As another case, the device/appliance 300 and host 320 can be in one machine where the host capability is built into the device/appliance 300. Other local MTAs include local MTA 324 and 326. Mail to be transmitted and received may be queued in a queue of mail 330 of the relay MTA 328. The messages are transferred across the TCP connection 310, which may be, for example, the Internet, or may be any other type of network or connection.

The transmitted messages are received by the relay MTA 332 and if desired, stored in a queue of mail 334. The mail is then forwarded to the local MTA 340 of a receiving host 342. The mail may be placed in one or more of the user mailboxes 314 and subsequently forwarded to the mail agent 316 and finally forwarded to the user at a terminal 318. If desired, the mail may be directly forwarded to the terminal without user interaction. Other local MTAs at the receiving side include MTA 338 and local MTA 336 which may have their own mailboxes, mail agents, and terminals.

FIGS. 6A–6C and 7 show the message transfer from the device/appliance 300 to the remote terminals, such as 342. The messages can also flow from the remote terminals to the device/appliance 300 in the reverse direction using the same mail protocol such as SMTP.

Figure 8:
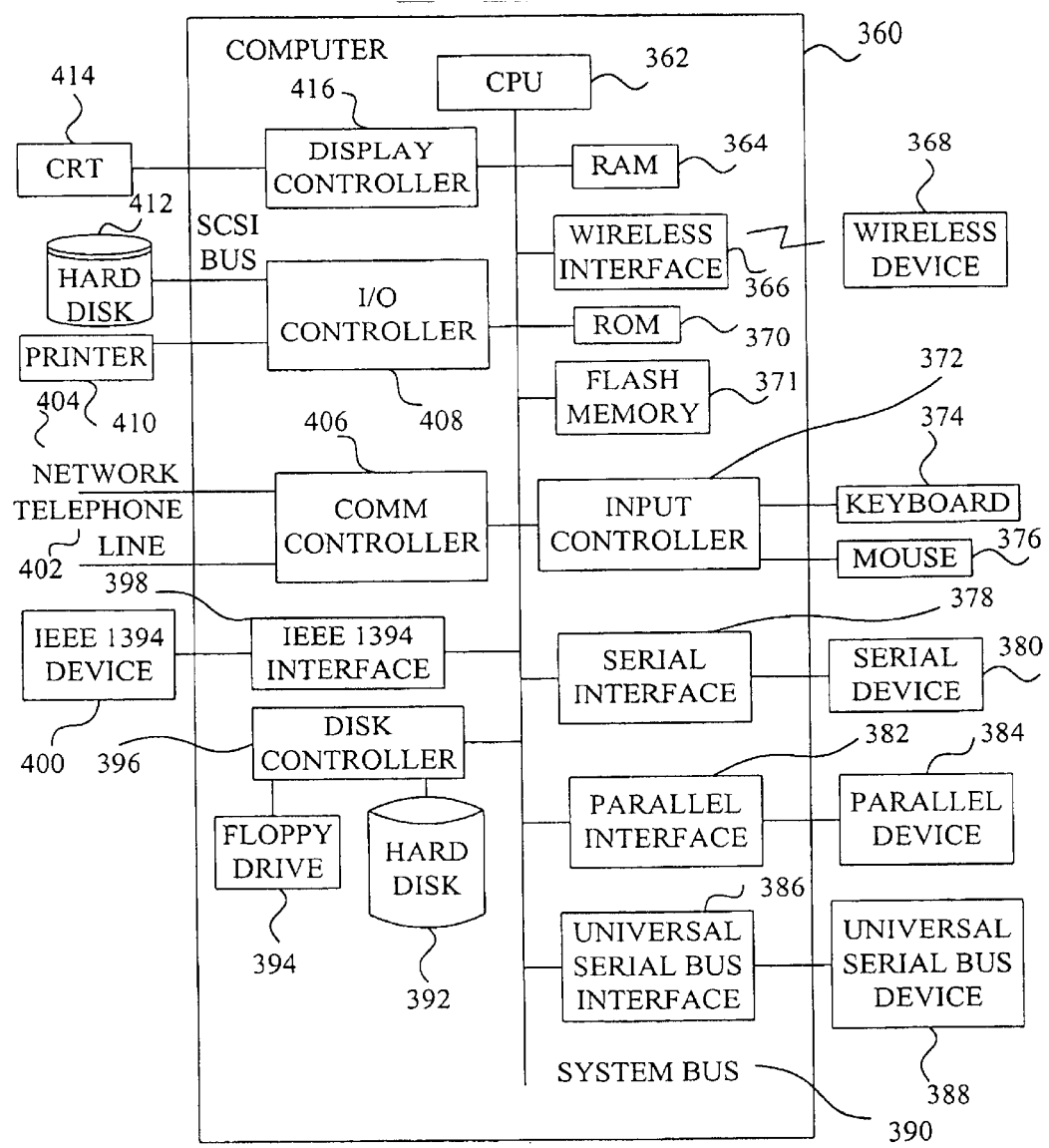
FIG. 8 illustrates an exemplary computer which may be connected to the device/appliance and used to communicate with the device/appliance.

The various computers utilized by the present invention, including the computers 266 and 276 of FIG. 5, may be implemented as illustrated in FIG. 8. Further, any other computer utilized by this invention may be implemented in a similar manner to the computer illustrated in FIG. 8, if desired, including the service machine 254, computer 272, and computer 282 of FIG. 5. However, not every element illustrated in FIG. 8 is required in each of these computers. In addition, some business office appliances, such as a thin server, may be implemented in a similar manner to the computer illustrated in FIG. 8. In FIG. 8, the computer 360 includes a CPU 362 which may be implemented as any type of processor including commercially available microprocessors from companies such as Intel, AMD, Motorola, Hitachi and NEC. There is a working memory such as a RAM 364, and a wireless interface 366 which communicates with a wireless device 368. The communication between the interface 366 and device 368 may use any wireless medium (e.g., radio waves, or light waves). The radio waves may be implemented using a spread spectrum technique such as Code Division Multiple Access (CDMA) communication or using a frequency hopping technique such as that disclosed in the Bluetooth specification.

There is a ROM 370, and a flash memory 371, although any other type of nonvolatile memory may be utilized in addition to or in place of the flash memory 371 such as an EEPROM, for example. An input controller 372 has connected thereto a keyboard 374 and a mouse 376. There is a serial interface 378 connected to a serial device 380. Additionally, a parallel interface 382 is connected to a parallel device 384, a universal serial bus interface 386 is connected to a universal serial bus device 388, and also there is an IEEE 1394 device 400, commonly referred to as a fire wire device, connected to an IEEE 1394 interface 398. The various elements of the computer 360 are connected by a system bus 390. A disk controller 396 is connected to a floppy disk drive 394 and a hard disk drive 392. A communication controller 406 allows the computer 360 to communicate with other computers and devices/appliances (e.g., by sending e-mail messages) over a telephone line 402 or a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

Figure 9:
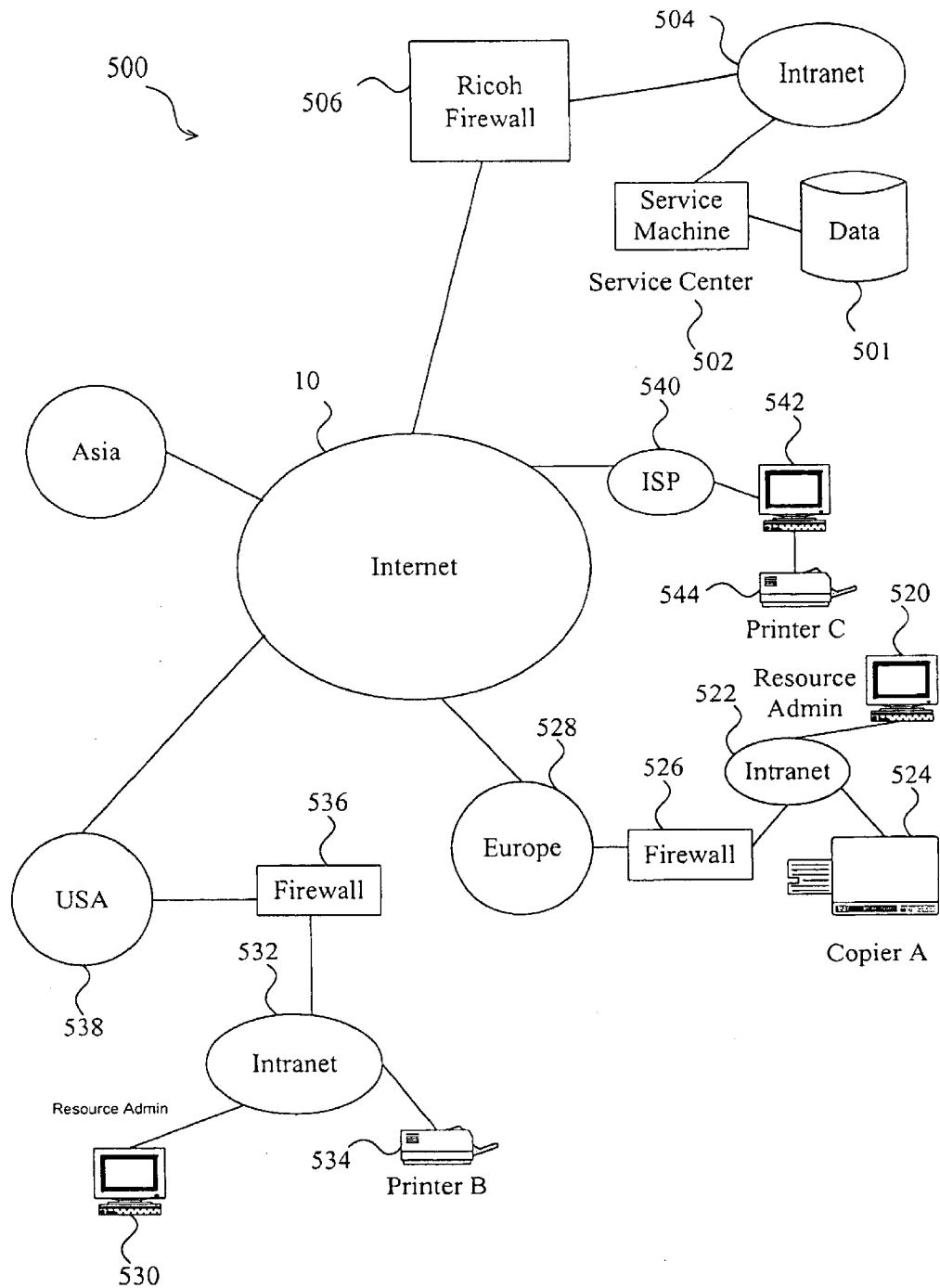
FIG. 9 illustrates a network with a Service Center.

FIG. 9 illustrates an exemplary network with resource administration stations and a service center. The WAN or Internet 10 provides connectivity to a plurality of Intranets 504, 522 and 532, each having firewalls 506, 526, and 536, respectively, for a system 500. As illustrated, the Intranet 504 is an exemplary Ricoh Intranet including the Ricoh Firewall 506, a Service Center 502 having access to data 501 in a database connected to a Service Machine at a Service Center 502. As illustrated, the exemplary Intranet 522 is resident in Europe 528. The Intranet 522 includes a Resource Administrator 520 and Copier A 524. The exemplary Intranet 532 resides in the USA 538 and includes a Resource Administrator 530 and a Printer B 534. Also, as illustrated in FIG. 9, an Internet Service Provider (ISP) 540 is connected to a computer 542 which is connected to a Printer C 544. The data 501 includes information regarding usage by an end user of network resources such as, for example, a number of pages printed by an end user of Printer B 534, and for example the database of machine history and service history, machine configuration, and device driver version of the monitored devices. Another database may contain various versions of the device drivers for the various models of the machines supported by the service system.

Figure 10:
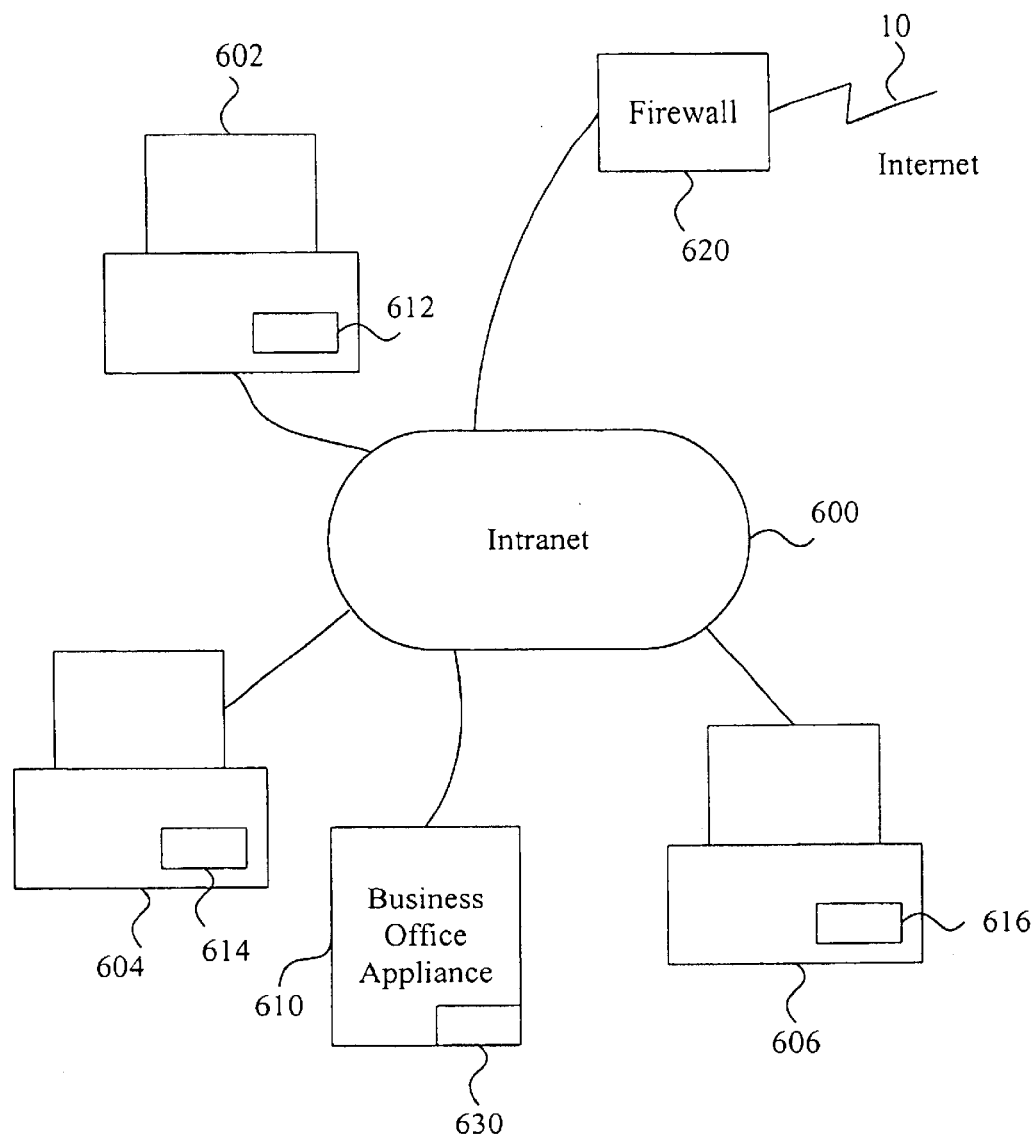
FIG. 10 illustrates an exemplary Intranet with various computers using a business office appliance.

FIG. 10 shows an exemplary network with a Business Office Appliance 610 containing the newest driver, as well as older drivers 630 to run the appliance 610. The firewall 620 is connected to the WAN or Internet 10. An Intranet 600 connects three computers 602, 604 and 606 with drivers 612, 614 and 616 to use the Business Office Appliance 610. The Business Office Appliance 610 receives the newest, or desired driver from the service center 502 of FIG. 9. If configured accordingly, the Business Office Appliance 610 is contacted from the service center 502 through the firewall 620 and the drivers will be downloaded from the service center along with an update to driver tables. Alternatively, the Business Office Appliance 610 receives e-mail with the driver update information to be performed as shown in FIG. 11.

Figure 11:
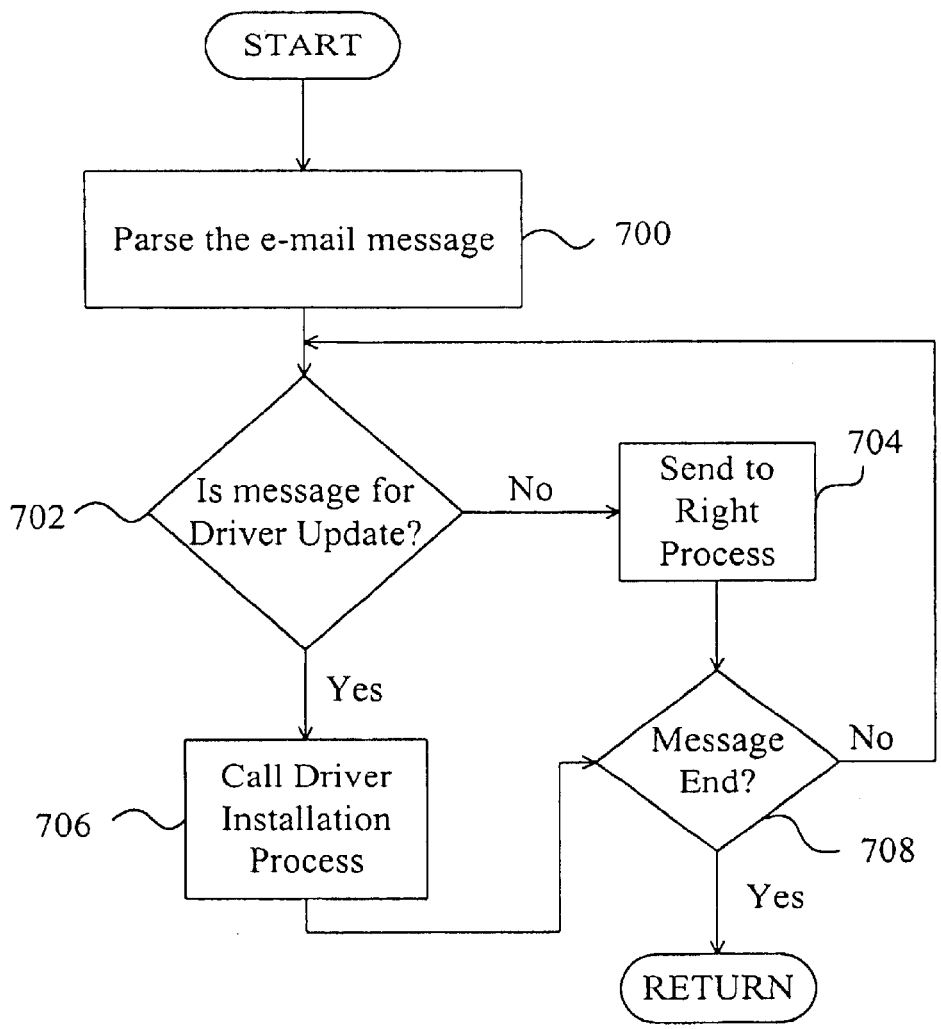
FIG. 11 is a flow chart illustrating the installation of a device driver using an e-mail message.

FIG. 11 is a flowchart of exemplary logic for processing the received e-mail message at the Business Office Appliance 610. When e-mail is received by the Business Office Appliance 610, step 700 parses the e-mail according to RFC 822 (Standard for the Format of ARPA Internet Text Messages). Step 702 determines whether the message is for updating the driver. If step 702 determines that the message is for updating the driver, at step 706, the system calls the Driver Installation Process with the necessary information (e.g., the encoded executable driver installation code, version number, target OS (Operating System), and effective dates as discussed in FIG. 12 below) in the e-mail message. If step 702 determines that the message is not for the updating of the driver, step 704 calls an appropriate process, as determined from the message (e.g., a process for checking printer page counter and sending the information back to the service center, a process for checking the remaining toner and sending the information back, and a process for obtaining the trouble log and sending the log to the service center).

Step 708 then checks for an end of message. If step 708 determines an end of message, then control is returned to the calling process. If step 708 determines that there are more messages, then control returns to step 702 as discussed previously.

If a direct connection with the Service Center can be established, the same logic illustrated in FIG. 11 can be used to perform the driver update task without the routines to handle the e-mail messages. Exemplary situations of direct connection occur when the Service Center can go through the firewall or when the Service Center is located within the Intranet.

Figure 12:
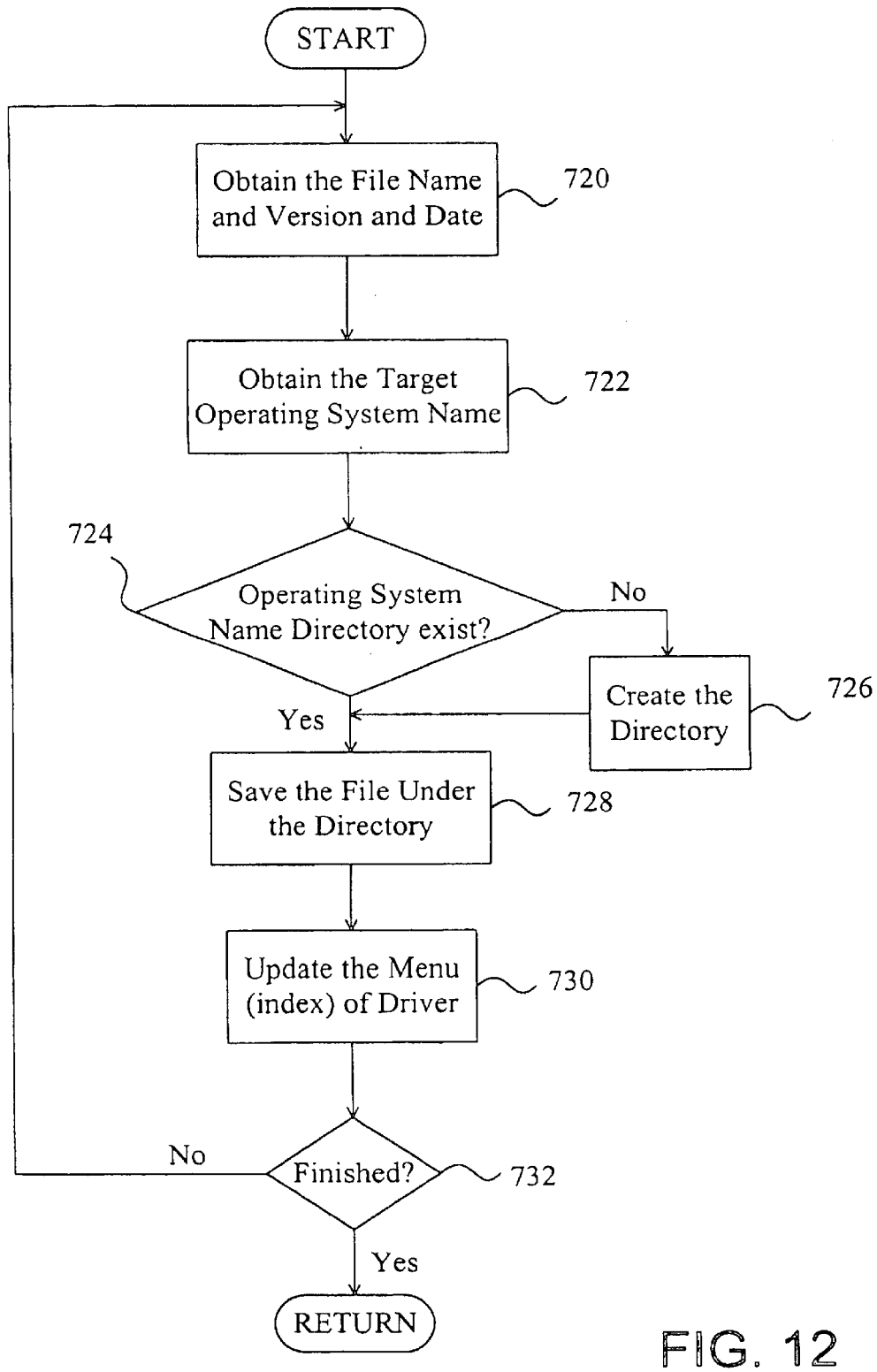
FIG. 12 is a flow chart illustrating the installation of the newest or desired device driver into a business office appliance.

FIG. 12 is a flowchart of exemplary logic for the Driver Installation Process referenced in the step 706 of FIG. 11. In step 720, the process obtains the file name, the version number and the effective date from the message content. Step 722 obtains the target operating system for the driver. Step 724 determines whether the directory name of the target operating system exists or not. If step 724 determines that the directory name does not exist, then step 726 creates the directory and control passes to step 728 as discussed below. If step 724 determines that the directory name exists, step 728 obtains the update driver file from the message and saves it in the directory. This step may involve the decoding of the file from text encoding to binary encoding if the e-mail utilized only allows the message to be sent in text format. Binary data must be encoded before being attached to the e-mail message. Step 730 updates the menu (index) of the driver. The structure of the menu is discussed below with regard to FIG. 13. Step 732 determines whether the updating is finished. If step 732 determines that the updating is finished, control is returned to the calling process; otherwise, control passes to step 720. It is to be noted that there may be more than one driver for different operating systems that are in the message, for example, one driver is for Window 95, 98 and NT, another for Macintosh, etc., as shown in FIG. 13.

Figure 13:
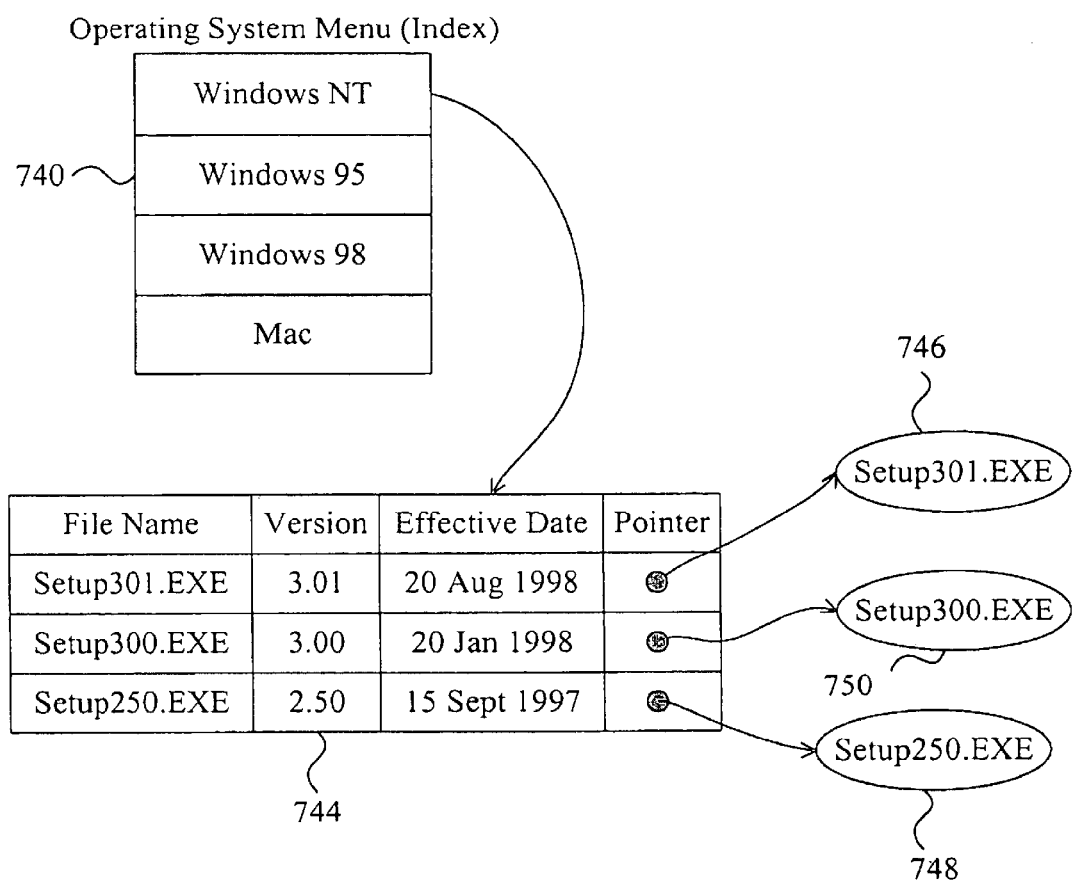
FIG. 13 illustrates tables (data structures) to keep track of the file name, version, effective date and the program.

FIG. 13 illustrates the menu (index) structure starting with an operating system menu 740. The operating system menu 740 includes Windows NT, Windows 95, Windows 98 and Macintosh. There may be more, or other operating systems such as Solaris, Linux and Unix BSD. Each entry in the operating system menu 740 points to a table 744 that lists the drivers stored in the Business Office Appliance 610. The table 744 includes the file name, version number, the effective date and a pointer to the actual file locations, for example, setup files 746, 748 and 750. If the resources for storing the drivers is limited, then the system may be configured to store only the newest driver for each operating system so that the operating system menu 740 and the table 744 may be combined. If the newest driver is the only one in the system, then the steps 724 and 726 of FIG. 12 are not needed.

Figure 14:
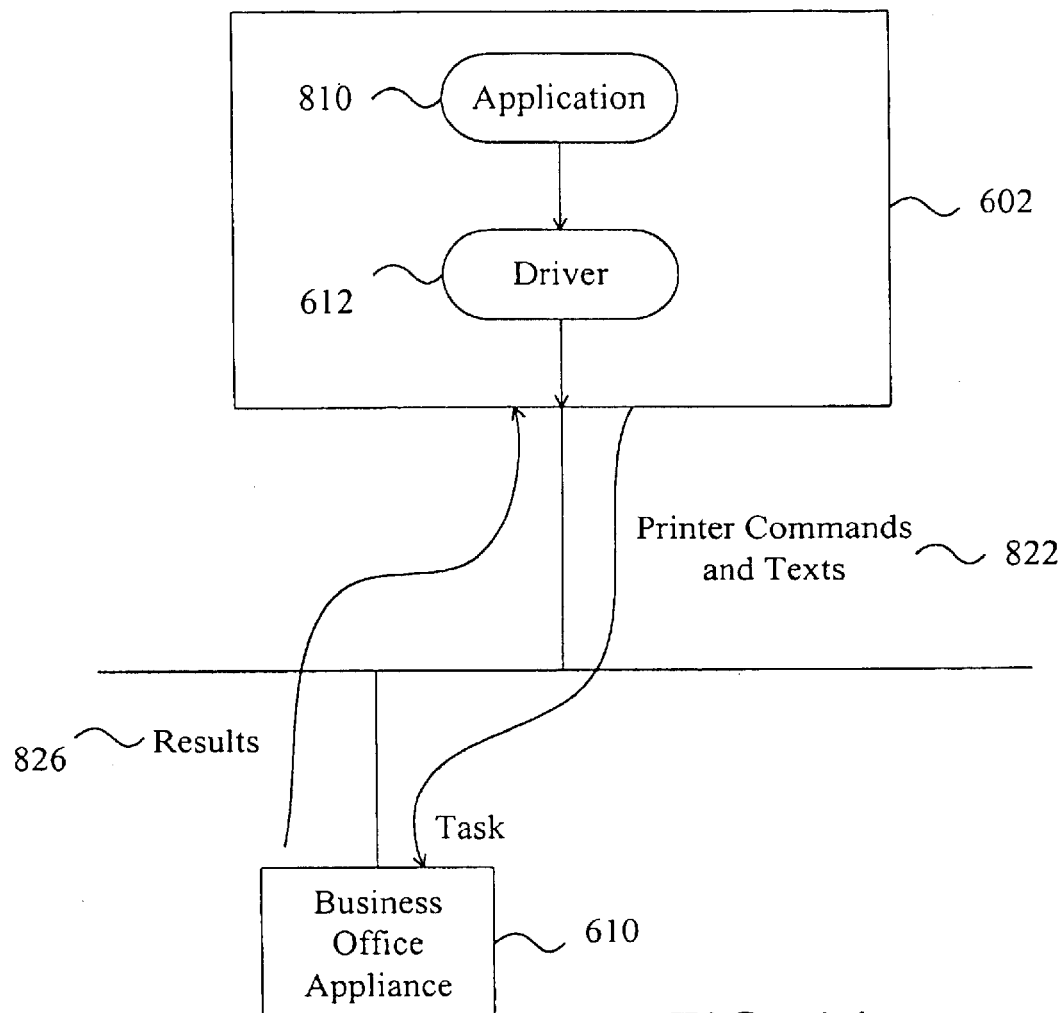
FIG. 14 is a block diagram of application software using a driver to access a business office appliance on the network.

FIG. 14 illustrates the use of the Business Office Appliance 610 by the computer 602 as discussed previously with regard to FIG. 10. An application 810 of FIG. 14, such as a word processor, needs to use the Business Office Appliance 610, such as a printer. Normally, the driver 612 is called to print the document generated by a user of the application 810. In the case of a printer driver, the driver normally generates the necessary printer commands and texts and stores the results in a print spooler located in the system 602. When the Business Office Appliance 610 becomes available, the print spooler sends the generated printer commands and texts 822 to the printer 610. If there is any problem or if results need to be returned, the results 826 of the task at the printer 610 are sent back to the system 602. In the present invention, in addition to the normal tasks of the driver, the driver 612 contacts the Business Office Appliance 610 to check the newest version and asks the user if the user would like to update the driver when the current version is older than the newest version as discussed below with regard to FIG. 15.

Figure 15:
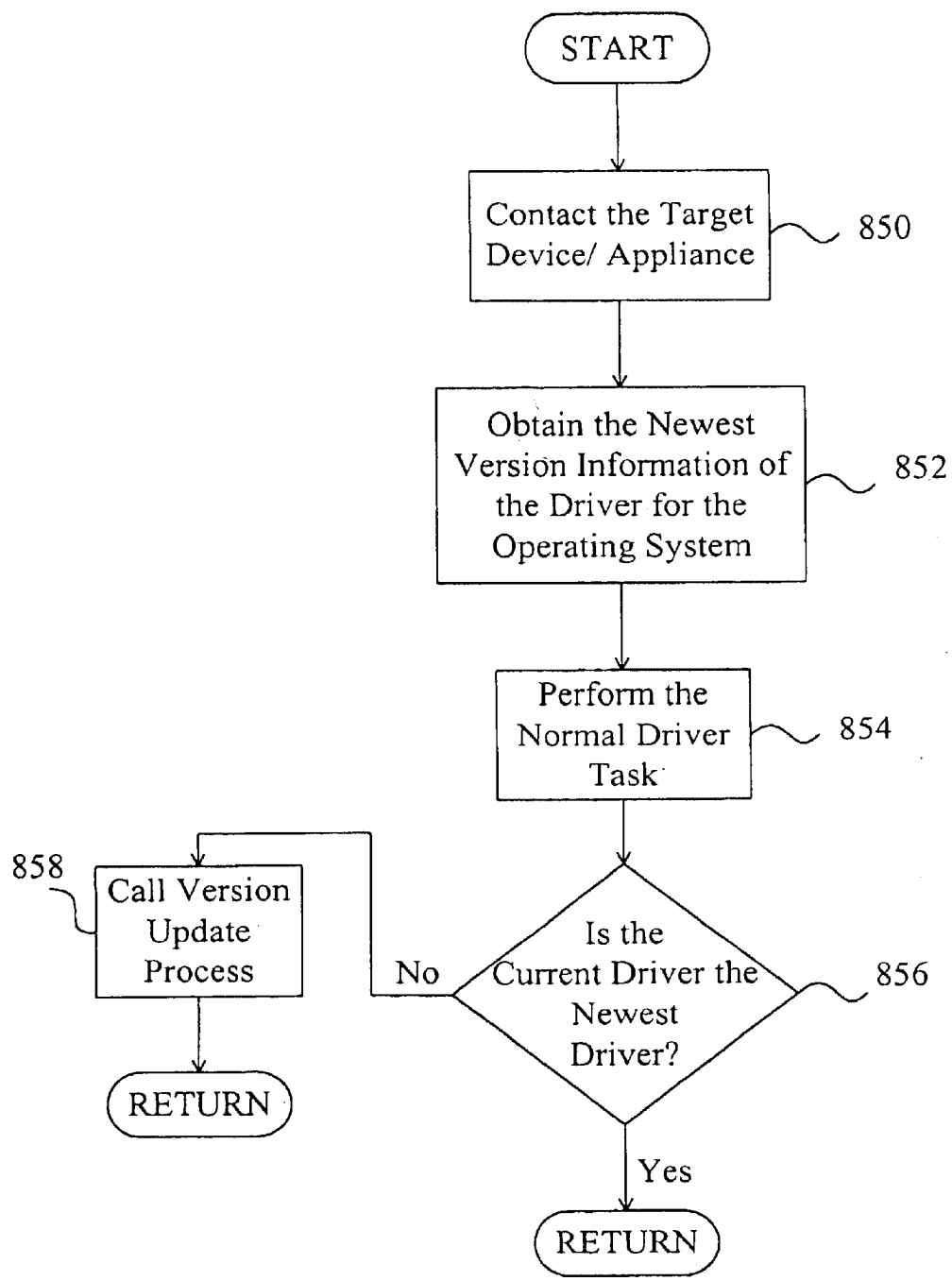
FIG. 15 is a flowchart of exemplary logic to be used by the driver illustrated in FIG. 14.

FIG. 15 is a flowchart of exemplary logic for the interaction between the driver 612 and the Business Office Appliance 610 discussed previously with regard to FIGS. 10 and 14. After starting, at step 850, the driver 612 contacts the target device/appliance 610. At step 852, the driver 612 obtains the newest version information of the driver for the operating system of the driver 612. At step 854, the driver 612 performs the normal task of the driver 612 (e.g., generating necessary printer commands and texts and storing the results in a print spooler, as discussed previously with regard to FIG. 14). An alternative implementation performs the normal task of the driver before contacting the target device/appliance and getting the driver information. Step 856 compares the current driver version information to the obtained newest driver version information. If step 856 determines that the current driver version is not the newest, step 858 calls a version update process to update the driver 612 before returning to the calling process. If step 856 determines that the current driver version is the newest, control is returned to the calling process.

Figure 16:
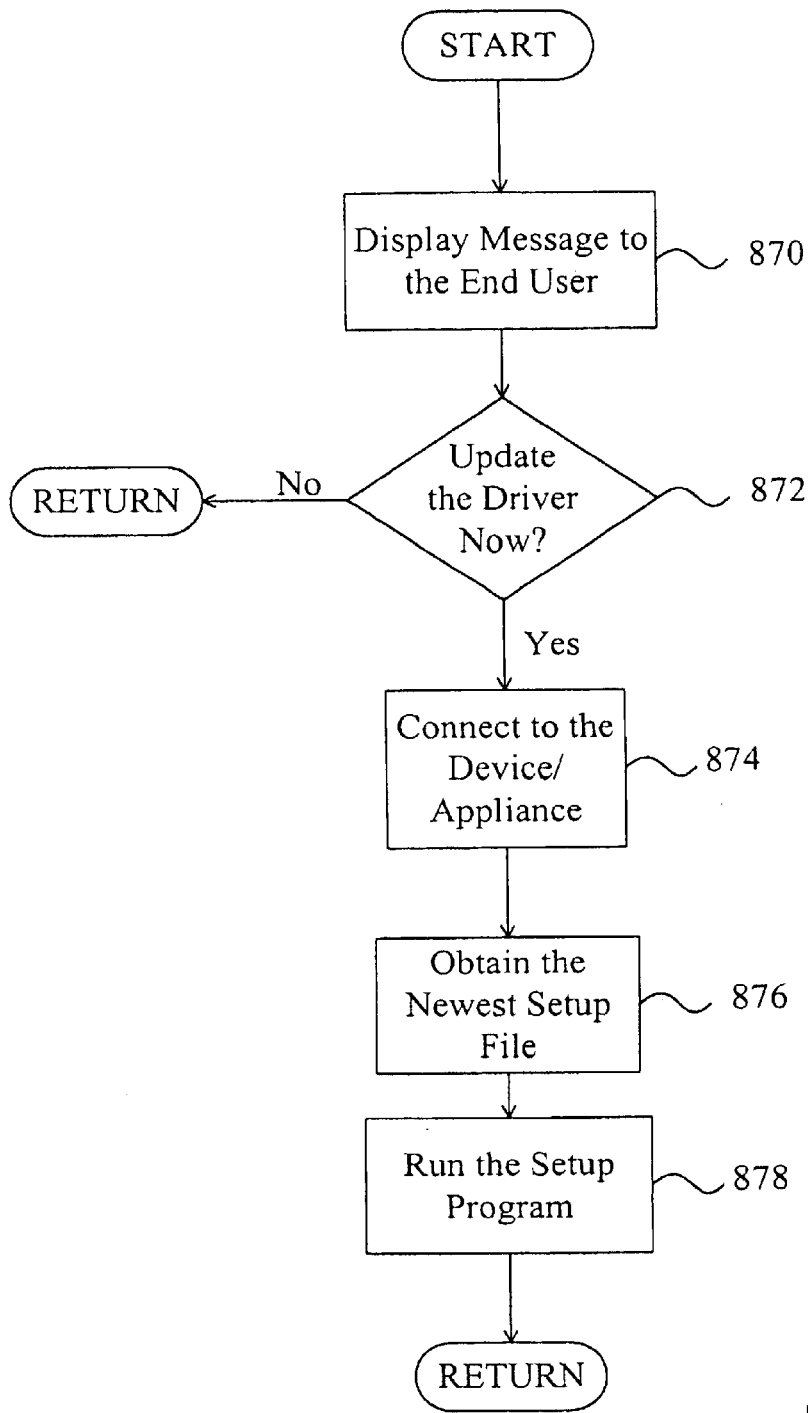
FIG. 16 is a flowchart illustrating the details of the version update illustrated in FIG. 15.

FIG. 16 is a flowchart of exemplary logic for the version update process called in the step 858 of FIG. 15. After starting, in step 870, the process displays a message asking the user if the user wants to update the driver for the Business Office Appliance 610 of FIG. 10. If step 872 determines that the response from the user is No, then control returns to the calling process. If step 872 determines that the response from the user is Yes, then step 874 establishes a connection to the device/appliance for the download. In step 876, the driver obtains the newest driver installation file and stores it in a temporary storage area. Step 878 executes the stored installation/setup program to install the newest driver. Alternatively, a selected version of the driver which is not the newest driver may be transferred and installed. Control is then returned to the calling process.

With the above-discussed operations, the present invention provides a transfer operation for downloading a newest driver for an appliance/device from the device itself to a client computer. The newest driver of the device may also be transmitted to the device from a service center. Further, such operations of the present invention allow device drivers and driver information to be stored and to be transmitted, at appropriately selected times, by a "store-and-forward" protocol (e.g., Internet mail) or by a direct connection. Internet mail is a convenient source of such a transmission because such a transmission of device drivers and driver information will typically not be time sensitive information. Further, utilizing an Internet mail system to communicate such data can significantly reduce costs of the transmission. By using these types of transmission of device drivers, the present invention can greatly increase the efficiency of downloading and installing newer versions of device drivers for devices/appliances for end clients.

In its preferred implementation, the present invention utilizes computers having separate housings than the device to which they are attached. This allows the invention to be inexpensively implemented for installations which already have an existing computer for performing the desired processing, thus the new hardware costs may be reduced. Such an arrangement may also permit implementation of the invention without hardware changes to the device. However, if desired, the present invention may be implemented by including the appropriate processing and data storage capabilities in the device which is being monitored and/or controlled in addition to or as an alternative to a separate computer connected to the device.

This application relates to and builds on various concepts which have been disclosed in the cross-referenced patents and patent applications which have been incorporated into this application by reference. This patent application is intended to include not only the inventions disclosed in the related applications, but also the combinations of various features and functions of the individual embodiments which have been disclosed in this and each of the related applications. Thus, a feature disclosed in one of the related applications or patents may be readily applied a concept disclosed in this invention, and also, the concepts disclosed in one or more of the other applications may be applied concepts or features disclosed in other(s) of the applications. Further, an e-mail message may be used for only sending, with communication in the other direction being performed using a different mode of communication, such as one of the other communication modes disclosed herein, or a communication mode disclosed in the related patents and patent applications.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMs, RAMs, EPROMS, EEPROMS, magnetic or optical cards, or any type of media suitable for storing electronic instructions.

Stored on any one or on a combination of computer readable media, the present invention includes software for controlling both the hardware of a computer and for enabling the computer to interact with a human user. Such software may include, but is not limited to, device drivers, operating systems, development tools, and user applications. Such computer readable media further includes the computer program product of the present invention for transferring a device driver between business office appliances and other devices. The computer code devices of the present invention can be any interpreted or executable code mechanism, including but not limited to scripts, interpreters, dynamic link libraries, Java classes, and complete executable programs.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A method, comprising:
    monitoring a first device by a second device;
    determining, by the second device, whether a current device driver in the first device is a desired device driver;
    first transferring the desired device driver from the second device to the first device when it is determined that the current device driver in the first device is different from the desired device driver, wherein the current device driver and the desired device driver are configured to control operations of the first device;
    accessing the first device by a third device using the current device driver to obtain information of the desired device driver, and determining based on the obtained information, whether the current device driver is different from the desired device driver;
    determining whether a user of the third device desires the desired device driver to be transferred to the third device when it is determined that the current device driver is different from the desired device driver; and
    second transferring the desired device driver from the first device to the third device when it is determined that the user of the third device desires the desired device driver to be transferred to the third device, wherein the desired device driver is configured to control operations of the first device by the user of the third device.

2. The method according to claim 1, wherein the step of first transferring further comprises:
    first transferring the desired device driver from the second device to the first device using at least one of a direct connection message, a network mail message and an electronic mail message when it is determined that the current device driver in the first device is different from the desired device driver, wherein the current device driver and the desired device driver are configured to control operations of the first device.

3. The method according to claim 1, wherein the first device is connected to a first network and the second device is connected to a second network.

4. The method according to claim 3, wherein the first and second networks are connected by a third network.

5. The method according to claim 1, wherein the step of first transferring further comprises:
    first transferring the desired device driver and desired device driver information from the second device to the first device when it is determined that the current device driver in the first device is different from the desired device driver, wherein the current device driver and the desired device driver are configured to control operations of the first device.

6. The method according to claim 5, wherein the desired device driver information includes at least one of
    information indicating a version of the desired device driver,
    an effective date of the desired device driver, and
    an indication of an operating system for the desired device driver.

7. A method, comprising:
    accessing a second device by a first device using a current device driver to obtain information of a desired device driver, and determining, based on the obtained information, whether the current device driver is different from the desired device driver;
    determining whether a user of the first device desires a desired device driver of the second device to be transferred to the first device when it is determined that the current device driver is different from the desired device driver; and
    transferring the desired device driver from the second device to the first device when it is determined that the user of the first device desires the desired device driver of the second device to be transferred to the first device, wherein the desired device driver is configured to control operations of the second device by the first device,
    wherein the second device is monitored by a third device to determine whether a current device driver in the second device is the desired device driver, and to transfer the desired device driver from the third device to the second device when it is determined that the current device driver in the second device is different from the desired device driver, wherein the current device driver and the desired device driver are configured to control operations of the second device.

8. The method according to claim 7, wherein the step of transferring further comprises:
    transferring the desired device driver from the second device to the first device when it is determined that the user of the first device desires the desired device driver of the second device to be transferred to the first device using at least one of a direct connection message, a network mail message and an electronic mail message, wherein the desired device driver is configured to control operations of the second device, and wherein the second device comprises a business office appliance.

9. A system, comprising:
    a first device;
    a second device configured to monitor the first device, to determine whether a current device driver in the first device is a desired device driver; and to transfer the desired device driver from the second device to the first device when it is determined that the current device driver in the first device is different from the desired device driver, wherein the current device driver and the desired device driver are configured to control operations of the first device; and
    a third device configured to access the first device using the current device driver to obtain information of the desired device driver, to determine, based on the obtained information, whether the current device driver is different from the desired device driver and to determine whether a user of the third device desires the desired device driver to be transferred to the third device when it is determined that the current device driver is different from the desired device driver, wherein the first device is further configured to transfer the desired device driver from the first device to the third device when the third device determines that the user of the third device desires the desired device driver to be transferred to the third device, wherein the desired device driver is configured to control operations of the first device by the user of the third device.

10. The system according to claim 9, wherein second device is further configured to transfer the desired device driver from the second device to the first device using at least one of a direct connection message, a network mail message and an electronic mail message.

11. The system according to claim 9, wherein the first device is connected to a first network and the second device is connected to a second network.

12. The system according to claim 11, wherein the first and second networks are connected by a third network.

13. The system according to claim 9, wherein the second device is further configured to transfer desired device driver information from the second device to the first device.

14. The system according to claim 13, wherein the desired device driver information includes at least one of information indicating a version of the desired device driver, an effective date of the desired device driver, and an indication of an operating system for the desired device driver.

15. A system, comprising:

a first device; and a second device, wherein the first device is configured to access the second device using a current device driver to obtain information of a desired device driver, to determine, based on the obtained information, whether the current device driver is different from the desired device driver, and to determine whether a user of the first device desires a desired device driver of a second device to be transferred to the first device when it is determined that the current device driver is different from the desired device driver, and the second device is configured to transfer the desired device driver from the second device to the first device when the first device determines that the user of the first device desires the desired device driver of the second device to be transferred to the first device, wherein the desired device driver is configured to control operations of the second device by the first device;

wherein the second device is monitored by a third device to determine whether a current device driver in the second device is the desired device driver, and to transfer the desired device driver from the third device to the second device when it is determined that the current device driver in the second device is different from the desired device driver, wherein the current device driver and the desired device driver are configured to control operations of the second device.

16. The system according to claim 15, wherein the second device is configured to transfer the desired device driver from the second device to the first device using at least one of a direct connection message, a network mail message and an electronic mail message, and wherein the second device comprises a business office appliance.

17. A program product including a computer readable medium embodying program instructions for causing a system to perform the steps of:

monitoring a first device by a second device;

determining, by the second device, whether a current device driver in the first device is a desired device driver;

first transferring the desired device driver from the second device to the first device when it is determined that the current device driver in the first device is different from the desired device driver, wherein the current device driver and the desired device driver are configured to control operations of the first device;

accessing the first device by a third device using the current device driver to obtain information of the desired device driver, and determining, based on the obtained information, whether the current device driver is different from the desired device driver;

determining whether a user of a third device desires the desired device driver to be transferred to the third device when it is determined that the current device driver is different from the desired device driver; and second transferring the desired device driver from the first device to the third device when it is determined that the user of the third device desires the desired device driver to be transferred to the third device, wherein the desired device driver is configured to control operations of the first device by the user of the third device.

18. The program product according to claim 17, wherein the step of first transferring further comprises:

first transferring the desired device driver from the second device to the first device using at least one of a direct connection message, a network mail message and an electronic mail message when it is determined that the current device driver in the first device is different from the desired device driver, wherein the current device driver and the desired device driver are configured to control operations of the first device.

19. The program product according to claim 17, wherein the first device is connected to a first network and the second device is connected to a second network.

20. The program product according to claim 19, wherein the first and second networks are connected by a third network.

21. The program product according to claim 17, wherein the step of first transferring further comprises:

first transferring the desired device driver and desired device driver information from the second device to the first device when it is determined that the current device driver in the first device is different from the desired device driver, wherein the current device driver and the desired device driver are configured to control operations of the first device.

22. The program product according to claim 21, wherein the desired device driver information includes at least one of information indicating a version of the desired device driver, an effective date of the desired device driver, and an indication of an operating system for the desired device driver.

23. A program product including a computer readable medium embodying program instructions for causing a system to perform the steps of:

accessing a second device by a first device having a current device driver to obtain information of a desired device driver, and determining, based on the obtained information, whether the current device driver is different from the desired device driver;

determining whether a user of the first device desires the desired device driver of the second device to be transferred to the first device when it is determined that the current device driver is different from the desired device driver; and transferring the desired device driver from the second device to the first device when it is determined that the user of the first device desires the desired device driver of the second device to be transferred to the first device, wherein the desired device driver is configured to control operations of the second device, by the first device;

wherein the second device is monitored by a third device to determine whether a current device driver in the second device is the desired device driver, and to transfer the desired device driver from the third device to the second device when it is determined that the current device driver in the second device is different from the desired device driver, wherein the current device driver and the desired device driver are configured to control operations of the second device.

24. The program product according to claim 23, wherein the step of transferring further comprises transferring the desired device driver from the second device to the first device when it is determined that the user of the first device desires the desired device driver of the second device to be transferred to the first device using at least one of a direct connection message, a network mail message and an electronic mail message, wherein the desired device driver is configured to control operations of the second device, and wherein the second device comprises a business office appliance.

25. The method of claim 1, wherein the desired device driver is configured to control operations of the first device by the third device.

26. The system of claim 9, wherein the desired device driver is configured to control operations of the first device by the third device.

27. The program product of claim 17, wherein the desired device driver is configured to control operations of the first device by the third device.

* * * * *